United States Patent
Günther et al.

(10) Patent No.: US 10,703,851 B2
(45) Date of Patent: Jul. 7, 2020

(54) NITROGEN-CONTAINING COMPOUNDS SUITABLE FOR USE IN THE PRODUCTION OF POLYURETHANES

(71) Applicant: Evonik Degussa GmbH, Essen (DE)

(72) Inventors: Thomas Günther, Neuss (DE); Michael Fiedel, Essen (DE); Martin Glos, Borken (DE); Roland Hubel, Essen (DE); Frank Schubert, Neukirchen-Vluyn (DE)

(73) Assignee: Evonik Operations GmbH, Essen (DE)

( * ) Notice: Subject to any disclaimer, the term of this patent is extended or adjusted under 35 U.S.C. 154(b) by 259 days.

(21) Appl. No.: 15/322,275

(22) PCT Filed: Jul. 10, 2015

(86) PCT No.: PCT/EP2015/065818
§ 371 (c)(1),
(2) Date: Dec. 27, 2016

(87) PCT Pub. No.: WO2016/020138
PCT Pub. Date: Feb. 11, 2016

(65) Prior Publication Data
US 2017/0174817 A1   Jun. 22, 2017

(30) Foreign Application Priority Data
Aug. 5, 2014   (DE) .................... 10 2014 215 384

(51) Int. Cl.
| | | |
|---|---|---|
| *C08G 18/20* | (2006.01) | |
| *C08G 18/48* | (2006.01) | |
| *C08G 18/76* | (2006.01) | |
| *C08G 18/24* | (2006.01) | |
| *C08G 18/32* | (2006.01) | |
| *C08G 18/63* | (2006.01) | |
| *C08G 18/66* | (2006.01) | |
| *C08G 18/40* | (2006.01) | |
| *C08G 18/16* | (2006.01) | |
| *C08G 101/00* | (2006.01) | |

(52) U.S. Cl.
CPC ....... *C08G 18/2081* (2013.01); *C08G 18/165* (2013.01); *C08G 18/244* (2013.01); *C08G 18/3206* (2013.01); *C08G 18/3275* (2013.01); *C08G 18/4072* (2013.01); *C08G 18/4829* (2013.01); *C08G 18/632* (2013.01); *C08G 18/6688* (2013.01); *C08G 18/7621* (2013.01); *C08G 18/7664* (2013.01); *C08G 18/7671* (2013.01); *C08G 2101/0008* (2013.01); *C08G 2101/0016* (2013.01); *C08G 2101/0025* (2013.01); *C08G 2101/0083* (2013.01)

(58) Field of Classification Search
CPC ............ C08G 18/2081; C08G 18/7671; C08G 18/632; C08G 18/6688; C08G 18/7621; C08G 18/4072; C08G 18/3275; C08G 18/3206; C08G 18/4829; C08G 18/244; C08G 18/165; C08G 18/7664; C08G 2101/0008; C08G 2101/0016; C08G 2101/0025; C08G 2101/0083
See application file for complete search history.

(56) References Cited

U.S. PATENT DOCUMENTS

| | | | |
|---|---|---|---|
| 2,834,748 | A | 5/1958 | Bailey et al. |
| 2,917,480 | A | 12/1959 | Bailey et al. |
| 3,346,557 | A | 10/1967 | Patton, Jr. et al. |
| 3,629,308 | A | 12/1971 | Bailey et al. |
| 3,900,424 | A | 8/1975 | Inoue et al. |
| 3,933,695 | A | 1/1976 | Omietanski et al. |
| 3,953,383 | A | 4/1976 | Inoue et al. |
| 4,042,540 | A | 8/1977 | Lammerting et al. |
| 4,147,847 | A | 4/1979 | Schweiger |
| 4,248,930 | A | 2/1981 | Haas et al. |
| 4,500,704 | A | 2/1985 | Kruper, Jr. et al. |
| 4,855,379 | A | 8/1989 | Budnik et al. |
| 5,134,217 | A | 7/1992 | Weider et al. |
| 5,274,114 | A | 12/1993 | Weider et al. |
| 5,306,737 | A | 4/1994 | Burkhart et al. |
| 5,321,051 | A | 6/1994 | Burkhart et al. |
| 5,357,018 | A | 10/1994 | Burkhart et al. |
| 5,476,969 | A | 12/1995 | Hinz et al. |
| 5,844,010 | A | 12/1998 | Burkhart et al. |
| 6,359,022 | B1 | 3/2002 | Hickey et al. |
| RE38,415 | E | 2/2004 | Weider et al. |

(Continued)

FOREIGN PATENT DOCUMENTS

| | | |
|---|---|---|
| CA | 2008639 A1 | 8/1990 |
| CN | 102503909 A | 6/2012 |

(Continued)

OTHER PUBLICATIONS

German language International Search Report dated Oct. 30, 2015 in PCT/EP2015/065818 (4 pages).

(Continued)

*Primary Examiner* — Rabon A Sergent

(74) *Attorney, Agent, or Firm* — Nexsen Pruet PLLC; Philip P. McCann

(57) ABSTRACT

The present invention relates to the use of nitrogenous compounds of formula (I) and/or corresponding quaternized and/or protonated compounds for production of polyurethanes, to compositions comprising said compounds and also to polyurethane systems, in particular polyurethane foams, obtained using said compounds.

19 Claims, No Drawings

(56) References Cited

U.S. PATENT DOCUMENTS

| | | |
|---|---|---|
| 6,762,274 B2 | 7/2004 | Waddington et al. |
| 6,924,321 B2 | 8/2005 | Casati et al. |
| 7,671,103 B2 | 3/2010 | Eilbracht et al. |
| 7,671,104 B2 | 3/2010 | Heinemann et al. |
| 7,838,566 B2 | 11/2010 | Glos et al. |
| 7,858,829 B2 | 12/2010 | Hubel et al. |
| 8,247,467 B2 | 8/2012 | Mijolovic et al. |
| 8,247,525 B2 | 8/2012 | Schubert et al. |
| 8,268,939 B2 | 9/2012 | Ebrecht |
| 8,283,422 B2 | 10/2012 | Schubert et al. |
| 8,303,843 B2 | 11/2012 | Glos et al. |
| 8,309,664 B2 | 11/2012 | Knott et al. |
| 8,309,673 B2 | 11/2012 | Schubert et al. |
| 8,324,325 B2 | 12/2012 | Knott et al. |
| 8,334,355 B2 | 12/2012 | Henning et al. |
| 8,349,907 B2 | 1/2013 | Henning et al. |
| 8,420,567 B1 | 4/2013 | Naumann et al. |
| 8,450,514 B2 | 5/2013 | Schubert et al. |
| 8,476,189 B1 | 7/2013 | Naumann et al. |
| 8,609,798 B2 | 12/2013 | Knott et al. |
| 8,623,984 B2 | 1/2014 | Henning et al. |
| 8,729,207 B2 | 5/2014 | Hartung et al. |
| 8,735,458 B2 | 5/2014 | Glos et al. |
| 8,772,423 B2 | 7/2014 | De Gans et al. |
| 8,779,079 B2 | 7/2014 | Henning et al. |
| 8,802,744 B2 | 8/2014 | Knott et al. |
| 8,841,403 B2 | 9/2014 | Schmitz et al. |
| 8,883,932 B2 | 11/2014 | Brugger et al. |
| 8,906,974 B2 | 12/2014 | Glos et al. |
| 8,912,277 B2 | 12/2014 | Glos |
| 8,921,437 B2 | 12/2014 | Knott et al. |
| 8,946,310 B2 | 2/2015 | Glos et al. |
| 8,957,009 B2 | 2/2015 | Schubert et al. |
| 8,957,121 B2 | 2/2015 | Schiller et al. |
| 8,969,502 B2 | 3/2015 | Knott et al. |
| 8,974,627 B2 | 3/2015 | Schubert et al. |
| 8,993,706 B2 | 3/2015 | Schubert et al. |
| 9,035,011 B2 | 5/2015 | Ferenz et al. |
| 9,051,424 B2 | 6/2015 | Lobert et al. |
| 9,056,952 B2 | 6/2015 | Eilbracht et al. |
| 9,068,044 B2 | 6/2015 | Schubert et al. |
| 9,096,706 B2 | 8/2015 | Schmitz et al. |
| 9,115,335 B2 | 8/2015 | Trosin et al. |
| 9,175,126 B2 | 11/2015 | Albrecht et al. |
| 9,217,074 B2 | 12/2015 | Glos et al. |
| 9,315,614 B2 | 4/2016 | Schubert et al. |
| 9,328,210 B2 | 5/2016 | Terheiden et al. |
| 9,334,354 B2 | 5/2016 | Ferenz et al. |
| 9,346,919 B2 | 5/2016 | Jazkewitsch et al. |
| 9,353,225 B2 | 5/2016 | Knott et al. |
| 9,440,220 B2 | 9/2016 | Naumann et al. |
| 9,441,145 B2 | 9/2016 | Schubert et al. |
| 9,481,695 B2 | 11/2016 | Knott et al. |
| 9,505,895 B2 * | 11/2016 | Schmitz ............ C08G 18/7664 |
| 9,988,483 B2 * | 6/2018 | Forkner ............ C08G 18/4829 |
| 2002/0103091 A1 | 8/2002 | Kodali |
| 2006/0167125 A1 | 7/2006 | Bauer et al. |
| 2006/0229375 A1 | 10/2006 | Hsiao et al. |
| 2006/0293400 A1 | 12/2006 | Wiltz, Jr. et al. |
| 2007/0072951 A1 | 3/2007 | Bender et al. |
| 2007/0238800 A1 | 10/2007 | Neal et al. |
| 2007/0270518 A1 | 11/2007 | Nutzel |
| 2007/0282026 A1 | 12/2007 | Grigsby et al. |
| 2008/0114105 A1 | 5/2008 | Hell et al. |
| 2008/0234402 A1 | 9/2008 | Lehmann et al. |
| 2009/0088488 A1 | 4/2009 | Bruckner et al. |
| 2009/0088489 A1 | 4/2009 | Terheiden et al. |
| 2009/0137752 A1 | 5/2009 | Knott et al. |
| 2010/0029587 A1 | 2/2010 | Brueckner et al. |
| 2010/0036011 A1 | 2/2010 | De Gans et al. |
| 2010/0081781 A1 | 4/2010 | Schubert et al. |
| 2010/0240786 A1 | 9/2010 | Glos et al. |
| 2010/0266518 A1 | 10/2010 | Springer et al. |
| 2011/0062370 A1 | 3/2011 | Eilbracht et al. |
| 2011/0257280 A1 | 10/2011 | Glos et al. |
| 2011/0306694 A1 | 12/2011 | Glos et al. |
| 2012/0028022 A1 | 2/2012 | Brugger et al. |
| 2012/0037036 A1 | 2/2012 | Veit et al. |
| 2012/0068110 A1 | 3/2012 | Schubert et al. |
| 2012/0153210 A1 | 6/2012 | Glos et al. |
| 2012/0190760 A1 | 7/2012 | Henning et al. |
| 2012/0190762 A1 | 7/2012 | Hubel et al. |
| 2012/0264843 A1 | 10/2012 | Glos |
| 2013/0035407 A1 | 2/2013 | Lobert et al. |
| 2013/0035409 A1 | 2/2013 | Hubel et al. |
| 2013/0041115 A1 | 2/2013 | Knott et al. |
| 2013/0068990 A1 | 3/2013 | Eilbracht et al. |
| 2013/0150472 A1 | 6/2013 | Hubel et al. |
| 2013/0213267 A1 | 8/2013 | Fiedel et al. |
| 2013/0217930 A1 | 8/2013 | Haensel et al. |
| 2013/0245304 A1 | 9/2013 | Schubert et al. |
| 2013/0345318 A1 | 12/2013 | Schubert et al. |
| 2014/0058004 A1 | 2/2014 | Schmitz et al. |
| 2014/0256844 A1 | 9/2014 | Henning et al. |
| 2015/0031781 A1 | 1/2015 | Landers et al. |
| 2015/0057384 A1 | 2/2015 | Glos et al. |
| 2015/0093575 A1 | 4/2015 | Naumann et al. |
| 2015/0158968 A1 | 6/2015 | Schmitz et al. |
| 2015/0329752 A1 | 11/2015 | Albrecht et al. |
| 2015/0337072 A1 | 11/2015 | Schmitz et al. |
| 2015/0368420 A1 | 12/2015 | Schmitz et al. |
| 2016/0046757 A1 | 2/2016 | Landers et al. |
| 2016/0053051 A1 | 2/2016 | Schubert et al. |
| 2016/0053145 A1 | 2/2016 | Lobert et al. |
| 2016/0075846 A1 | 3/2016 | Krebs et al. |
| 2016/0096939 A1 | 4/2016 | Glos et al. |
| 2016/0130402 A1 | 5/2016 | Schubert et al. |
| 2016/0152739 A1 | 6/2016 | Eilbracht et al. |
| 2016/0161001 A1 | 6/2016 | Jobe et al. |
| 2016/0208050 A1 | 7/2016 | Klotzbach et al. |
| 2016/0264711 A1 | 9/2016 | Krebs et al. |
| 2016/0264757 A1 | 9/2016 | Krebs et al. |
| 2016/0311961 A1 | 10/2016 | Klostermann et al. |
| 2016/0311963 A1 | 10/2016 | Lobert et al. |
| 2016/0326330 A1 | 11/2016 | Schuette et al. |

FOREIGN PATENT DOCUMENTS

| | | |
|---|---|---|
| DE | 1695258 | * 12/1966 |
| DE | 2533074 A1 | 3/1976 |
| DE | 4135588 A1 | 5/1993 |
| DE | 4229402 A1 | 3/1994 |
| DE | 4239054 A1 | 5/1994 |
| DE | 102004001408 A1 | 7/2005 |
| DE | 102007046860 A1 | 4/2009 |
| EP | 0380993 A2 | 8/1990 |
| EP | 0493836 A1 | 7/1992 |
| EP | 0495249 A1 | 7/1992 |
| EP | 0499873 A2 | 8/1992 |
| EP | 533202 A1 | 3/1993 |
| EP | 0780414 A2 | 6/1997 |
| EP | 0839852 A2 | 5/1998 |
| EP | 0656382 B1 | 8/1998 |
| EP | 0867465 A1 | 9/1998 |
| EP | 1161474 A1 | 12/2001 |
| EP | 1520780 A1 | 4/2005 |
| EP | 1537159 A1 | 6/2005 |
| EP | 1544235 A1 | 6/2005 |
| EP | 1678232 A2 | 7/2006 |
| EP | 1712578 A1 | 10/2006 |
| EP | 1977825 A1 | 10/2008 |
| EP | 1985642 A1 | 10/2008 |
| EP | 1985644 A1 | 10/2008 |
| EP | 2042534 A1 | 4/2009 |
| EP | 2104696 B1 | 9/2013 |
| GB | 896437 A | 5/1962 |
| JP | 11-342341 | * 12/1999 |
| JP | 2015503655 A | 2/2015 |
| WO | 9612759 A2 | 5/1996 |
| WO | 0047647 A1 | 8/2000 |
| WO | 0058383 A1 | 10/2000 |
| WO | 0158976 A1 | 8/2001 |
| WO | 0222702 A1 | 3/2002 |
| WO | 03029320 A1 | 4/2003 |

(56) References Cited

FOREIGN PATENT DOCUMENTS

| WO | 2004020497 A1 | 3/2004 |
| WO | 2004060956 A1 | 7/2004 |
| WO | 2004096882 A1 | 11/2004 |
| WO | 2005033167 A2 | 4/2005 |
| WO | 2005063841 A1 | 7/2005 |
| WO | 2005085310 A2 | 9/2005 |
| WO | 2005118668 A1 | 12/2005 |
| WO | 2006055396 A1 | 5/2006 |
| WO | 2006094227 A2 | 9/2006 |
| WO | 2006116456 A1 | 11/2006 |
| WO | 2007111828 A2 | 10/2007 |
| WO | 2008058913 A1 | 5/2008 |
| WO | 2009058367 A1 | 5/2009 |
| WO | 2009130470 A1 | 10/2009 |
| WO | 2010028362 A1 | 3/2010 |
| WO | 2011163133 A1 | 12/2011 |
| WO | 2013022932 A1 | 2/2013 |
| WO | 2013102053 A1 | 7/2013 |

OTHER PUBLICATIONS

German language Search Report dated Mar. 12, 2015 in DE 10 2014 215 384.0 (6 pages).
German language Written Opinion dated Oct. 30, 2015 in PCT/EP2015/065818 (8 pages).
Günther et al., U.S. Appl. No. 15/322,514, filed Dec. 28, 2016.
International Search Report dated Oct. 30, 2015 in PCT/EP2015/065818 (3 pages).

\* cited by examiner

NITROGEN-CONTAINING COMPOUNDS SUITABLE FOR USE IN THE PRODUCTION OF POLYURETHANES

This application is a national stage application under 35 U.S.C. § 371 of International Application No. PCT/EP2015/065818 filed 10 Jul. 2015, which claims priority to German Application No. 102014215384.0 filed 5 Aug. 2014, the disclosures of which are expressly incorporated herein by reference.

FIELD

The present invention resides in the field of nitrogenous compounds, amines in particular, and of polyisocyanate polyaddition products, polyurethane in particular. The present invention relates in particular to the use of nitrogenous compounds of formula (I), corresponding to quaternized and/or protonated compounds, for production of polyurethanes, in particular polyurethane foams, to compositions comprising said compounds and also to polyurethane systems obtained using said compounds.

BACKGROUND

The use of tertiary amines in the manufacture of polyurethanes is known. A multiplicity of structurally different amines are employed therein as catalysts.

Polyurethanes for the purposes of the present invention are any reaction products between isocyanates, in particular polyisocyanates, and correspondingly isocyanate-reactive molecules. This also comprehends polyisocyanurates, polyureas and also allophanate-, biuret-, uretdione-, uretimine- or carbodiimide-containing isocyanate or polyisocyanate reaction products. The use of tertiary amines in the manufacture of polyisocyanate polyaddition products is preferable.

Polyurethane systems include, for example, polyurethane coatings, polyurethane adhesives, polyurethane sealants, polyurethane elastomers or foamed polyurethane materials, also known as polyurethane foams or PU foams.

Tertiary amines are particularly important in the manufacture of polyurethane foams because a delicate balance has to be achieved here between the "blowing reaction" (water reacts with isocyanate to form carbon dioxide as blowing gas) and the "gelling reaction" (polyols react with isocyanates to form urethanes, which leads to an increase in the molar mass and corresponding gelation) if a high-quality foam is to be obtained.

Polyurethane foams are cellular and/or microcellular polyurethane materials and are roughly subdividable into closed-cell or partly closed-cell rigid polyurethane foams and open-cell or partly open-cell flexible polyurethane foams. Rigid polyurethane foams are overwhelmingly used as insulating materials for example in refrigerator systems or in the thermal insulation of buildings. Flexible polyurethane foams are used in a multiplicity of technical applications in industry and the home, for example for soundproofing, for production of mattresses or for upholstery of furniture. The automotive industry is a particularly important market for various types of PU foams, such as conventional flexible foams based on ether or ester polyol, cold-cure flexible foams, hereinafter also known as cold-cure foams (frequently also as high-resilience (HR) foams), and rigid foams and also foams with properties that are between these classifications. The automotive industry may employ, for example, rigid foams as inner roof liners, ester foams as interior door trim and also for die-cut sun visors, and cold-cure and flexible foams for seating systems and mattresses.

Flexible foams may also be subdivided into cold-cure flexible foams and hot-cure flexible foams, as described for example in EP 2042534 A1, fully incorporated herein by reference.

There continues to be a need for further alternative catalysts, preferably nitrogenous catalysts, in particular alternative amines, suitable for production of polyurethanes and foamed polyurethane materials, preferably suitable for production of low-odour ageing-resistant polyurethane systems having low amine or other emissions, as for example of formaldehyde and/or dimethylformamide (DMF).

SUMMARY

The problem addressed by the present invention was therefore specifically that of providing an alternative catalyst for production of polyisocyanate reaction products, preferably polyurethanes, in particular foamed polyurethane materials which are preferably low-odour, ageing-resistant and/or free of emissions or at most having minimal amine or other emissions, as for example of formaldehyde and/or dimethylformamide (DMF).

The surprise finding was that compounds of formula (I) hereinbelow, the corresponding quaternized and/or protonated compounds solve this problem, i.e. not only the use of compounds of formula (I) but also the use of the corresponding protonated compounds but also the use of the corresponding quaternized compounds but also the use of corresponding mixtures each solve the recited problem.

The present invention accordingly provides for the use of one or more than one nitrogenous compound and/or corresponding quaternized and/or protonated compound in the manufacture of polyisocyanate polyaddition products, preferably polyurethanes, in particular foamed polyurethane materials, wherein this nitrogenous compound conforms to formula (I)

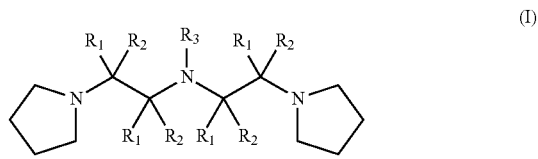

where
$R_1$ and $R_2$ being the same or different and each independently being hydrogen or an organic moiety of 1 to 30 carbon atoms, which may optionally be interrupted by one or more heteroatoms and/or substituted with one or more heteroatoms,
wherein $R_1$ and $R_2$ are the same or different and are each preferably hydrogen or a linear or branched, saturated or unsaturated hydrocarbyl moiety of 1 to 30 carbon atoms, which may optionally contain oxygen, nitrogen and/or halogen atoms,
wherein $R_1$ and $R_2$ are each particularly hydrogen,
with $R_3$ being H or an organic moiety of 1 to 20 carbon atoms, which may optionally be interrupted by one or more heteroatoms and/or substituted with one or more heteroatoms.

DETAILED DESCRIPTION

The expression "use of at least one nitrogenous compound or corresponding quaternized and/or protonated compound"

is to be understood here and hereinbelow within the meaning of this invention as comprehending the use of the particular nitrogenous compound concerned but also the use of the corresponding protonated compounds but also the use of the corresponding quaternized compounds but also the use of corresponding mixtures.

The present invention uses the nitrogenous compounds of formula (I) and also correspondingly quaternized and/or protonated compounds and also mixtures thereof as catalysts for production of polyisocyanate reaction products, preferably polyurethanes, in particular foamed polyurethane materials, to catalyse not only the gelling but also the blowing reaction in the foaming process and also advantageously further isocyanate reactions as described hereinbelow.

Advantageously, moreover, the present invention reduces or avoids catalysis-based emissions in the manufacture of polyurethane systems, in particular polyurethane foams.

There is in particular an additional advantage to the invention in that the compounds used according to the invention—nitrogenous compounds of formula (I), the corresponding quaternized and/or protonated compounds and also mixtures thereof—are advantageously low-emission, preferably free with regard to typical undesirable emissions from the resulting polyurethane systems, in particular polyurethane foams, more preferably flexible polyurethane foams, viz. advantageously low-emission with regard to emissions of nitrogenous compounds, hereinafter also called amine emissions, advantageously low-emission with regard to emissions of dimethylformamide (DMF), and also advantageously low-emission with regard to aldehyde emissions, in particular with regard to formaldehyde emissions.

"Low-emission" with regard to amines is to be understood for the purposes of the present invention as meaning in particular that the polyurethane system, preferably the foamed polyurethane material, more preferably the flexible polyurethane foam, yet more preferably the hot-cure flexible polyurethane foam, preferably for production of mattresses and/or upholstered furniture, has an amine emission of $\geq 0$ µg/m$^3$ and $\leq 40$ µg/m$^3$, preferably $\leq 10$ µg/m$^3$, more preferably $\leq 5$ µg/m$^3$, as determined by the DIN EN ISO 16000-9:2008-04 test chamber method, 24 hours after test chamber loading, and/or that the polyurethane system, preferably the foamed polyurethane material, in particular the flexible polyurethane foam, more preferably the cold-cure flexible polyurethane foam, preferably for production of polyurethanes for application in the automotive industry, in particular in automotive interiors, for example as roof liner, internal door trim, die-cut sun visors, steering wheels and/or seating systems, has an amine emission, hereinafter also called VOC emission or VOC value under VDA 278 (VOC=Volatile Organic Compounds), of $\geq 0$ µg/g and $\leq 40$ µg/g, preferably $\leq 10$ µg/g, more preferably $\leq 5$ µg/g, as determined by VDA 278 analytical method as of October 2011, "Thermodesorption analysis of organic emissions to characterize nonmetallic motor vehicle materials" (30 minutes at 90° C.) and/or that the polyurethane system, in particular the flexible polyurethane foam, more preferably the cold-cure flexible polyurethane foam, preferably for production of polyurethanes for application in the automotive industry, in particular in automotive interiors, for example as roof liner, internal door trim, die-cut sun visors, steering wheels and/or seating systems, has an amine emission, hereinafter also called fog emission or fog value under VDA 278 (fog=sparingly volatile substances which easily condense at room temperature and contribute to fogging of the windscreen), of $\geq 0$ µg/g and $\leq 40$ µg/g, preferably $\leq 10$ µg/g, more preferably $\leq 5$ µg/g, as determined by VDA 278 analytical method as of October 2011 (60 minutes at 120° C.). VDA is the German Association of the Automotive Industry (www.vda.de). Depending on the use intended for the polyurethane systems, in particular the foamed polyurethane materials, an example being their application in the automotive industry, a vehicle manufacturer may specify limits for total emissions of volatile organic compounds (VOC$_{tot}$ and/or fog$_{tot}$), for example VOC$_{tot}$$\leq 100$ µg/g and/or fog$_{tot}$$\leq 250$ µg/g. It is accordingly all the more important that the amine contribution to total emission (VOC$_{amine}$ and/or fog$_{amine}$) be minimized. The methods of determination which were chosen for the purposes of the present invention are in accordance with DIN EN ISO 16000-9:2008-04 and VDA 278 and are detailed in the example part.

"Low-emission" with regard to emissions of dimethylformamide (DMF) is to be understood for the purposes of the present invention as meaning that the nitrogenous compounds of formulae (I), (II), (III), (IV), (V), (VI) and/or (VII) of the present invention and/or corresponding polyurethane systems, preferably foamed polyurethane materials, in particular flexible polyurethane foams, more preferably hot-cure flexible polyurethane foams, as obtained using the aforementioned compounds, have a DMF emission of $\geq 0$ ppm and $\leq 5$ ppm, preferably $\leq 1$ ppm, more preferably $\leq 0.1$ ppm. The present invention thus advantageously makes possible in particular the provision of flexible polyurethane foams—most specifically hot-cure flexible polyurethane foams—which are particularly low-emission with regard to emissions of dimethylformamide. "DMF emission" for the purposes of the present invention is not a subset of "amine emission".

"Low-emission" with regard to emissions of aldehydes, in particular formaldehyde, is to be understood in the context of the present invention as meaning in particular that the polyurethane system, preferably the foamed polyurethane material, in particular the flexible polyurethane foam, meets the aldehyde emission, in particular formaldehyde emission, limits set by the foam manufacturers and the furniture industry in Europe and the U.S. in the voluntarily adopted "CertiPUR" programme, and/or that exchanging the conventional catalysts, in particular amines, particularly tertiary amines, containing one or more N-methyl or N,N-dimethyl groups, according to the prior art in the formulation of a corresponding polyurethane system for nitrogenous compounds to be used according to the present invention leads to an amelioration of aldehyde-based, in particular formaldehyde-based, emissions. The "CertiPUR" limit for formaldehyde emissions for example is 0.1 mg/m$^3$ in mattresses when measured using the ASTM Method D5116-97 Small Chamber Test with chamber conditioning for 16 hours. A person skilled in the art is aware of different analytical methods for determining aldehyde emissions. VDA 275, VDA 277 or else VDA 278 may be cited by way of example, as well as various chamber test methods. VDA is the German Association of the Automotive Industry (www.vda.de). "VDA 275" as of July 1994 provides a method of measurement for determining the aldehyde, especially formaldehyde, release by the modified bottle method, wherein the derivatizing reagent used for aldehydes, in addition to the typically used acetylacetone (via photometric detection), may also be 2,4-dinitrophenylhydrazine (2,4-DNP) (detection via HPLC after external calibration) in order that acetaldehyde and propionaldehyde may be better determined as well as formaldehyde. Both procedural versions of this VDA 275 are referenced in the context of this invention as preferred methods for determining aldehyde, in particular formaldehyde, emissions.

Advantageously, therefore, the present invention makes possible the provision of polyurethane systems, preferably foamed polyurethane materials, in particular flexible polyurethane foams, which are particularly low-emission with regard to emissions of nitrogenous compounds, hereinafter also referred to as amine emissions, even in relation to different requirements, and are preferably free of such emissions.

Advantageously, therefore, the present invention makes possible the provision of polyurethane systems, preferably foamed polyurethane materials, in particular flexible polyurethane foams, obtained using the aforementioned nitrogenous compounds, which are particularly low-emission with regard to emissions of dimethylformamide (DMF) even in relation to different requirements, and preferably are free of such emissions.

Advantageously, the present invention contributes to providing polyurethane systems, preferably foamed polyurethane materials, in particular flexible polyurethane foams, obtained using the aforementioned nitrogenous compounds, which are lower-emission with regard to emissions of aldehydes, in particular formaldehyde, even in relation to different requirements, than corresponding nitrogenous catalysts or corresponding polyurethane systems where instead of the nitrogenous compounds of the present invention it is conventional catalysts, in particular tertiary amines, containing one or more N-methyl or N,N-dimethyl groups, according to the prior art, that are used. This is because commercially available amines or PU systems comprising commercially available amines may otherwise—by reason of their industrial production for example—contain formaldehyde as an impurity, for example because formaldehyde or methanol were used as alkylating agents to produce the amine.

Advantageously, the present invention also contributes to the provision of low-odour polyurethane systems, preferably foamed polyurethane materials, in particular flexible polyurethane foams. Low-odour is to be understood here as meaning that the resulting polyurethane system has a very low level of product odour, in particular on using the nitrogenous compounds of the present invention as alternative catalysts to prior art catalysts, which is verifiable in particular through olfactory testing by a panel of olfactorily trained persons.

Advantageously, the present invention also contributes to improving the ageing characteristics, in particular the heat resistance and/or ageing resistance on heating (thermal ageing), of polyurethane systems, preferably foamed polyurethane materials, in particular flexible polyurethane foams. Such ageing phenomena are often closely linked to the choice of catalyst system for producing the polyurethane systems and generally lead to material fatigue. The nitrogenous compounds of the present invention advantageously provide an improvement in the heat resistance and/or durability of the corresponding polyurethane systems over polyurethane systems obtained using conventional catalysts according to the prior art. Advantageously, this effect is observable in particular on foamed polyurethane materials, preferably flexible slabstock foam, in particular as dry heat ageing to DIN EN ISO 2440/A1:2009-01, especially at a temperature of 70, 100, 120, 125 and/or 140° C. and an ageing time of 2, 4, 16, 22, 24, 48, 72 and/or 168 hours preferably at 2, 24 and/or 168 hours, when the foaming process is carried out using nitrogenous compounds according to formula (I) of the present invention as alternatives to structurally related catalysts according to the prior art.

Advantageously, the present invention also makes possible the provision of preferably discoloration-minimized polyurethane systems, in particular foamed polyurethane materials, preferably polyurethanes for application in the automotive industry, in particular in automotive interiors, for example as roof liners, interior door trim, die-cut sun visors, steering wheels and/or seating systems, in that the polyurethane systems provided by use of nitrogenous catalysts according to the present invention lead in particular to lower discolorations of plastics, in particular plastics covers, in automotive interiors than such polyurethane systems obtainable using conventional catalysts according to the prior art, in particular using amines that are not in accordance with the present invention. This can be shown in particular by means of a PVC discoloration test according to Volkswagen test method VW PV 3937, Amine Emissions by the Indicator Method.

Advantageously, the present invention makes possible a wider level of processing latitude in the manufacture of polyurethane systems, in particular semi-rigid polyurethane foams (open-cell rigid foams, for example for use as roof liner in automotive interiors). This means that, advantageously, larger variability in the use concentration of nitrogenous compounds according to the present invention is possible without adverse effect on the desired material-related properties, for example the open-cell content of the foam or of the density distribution across the foam slab, versus comparable prior art amine catalysts or prior art amine catalysts typically used for such applications. The result is an immense increase in user convenience.

Compounds of formula (I) may be quaternized using any reagent known to be useful as a quaternizing reagent. The quaternizing agents used are preferably alkylating agents, e.g. dimethyl sulphate, methyl chloride or benzyl chloride, more preferably methylating agents such as dimethyl sulphate in particular. Quaternization may similarly be effected with alkylene oxides, for example ethylene oxide, propylene oxide or butylene oxide, preferably with subsequent utilization with organic or inorganic acids.

Quaternized compounds of formula (I) may be singly or multiply quaternized. Preferably, the compounds of formula (I) are only singly quaternized. Singly quaternized compounds of formula (I) are preferably quaternized on a nitrogen atom which is part of a ring, preferably part of a pyrrolidine ring.

The compounds of formula (I) are convertible into the corresponding protonated compounds by reaction with organic or inorganic acids. These protonated compounds may be preferable, for example, when, for example, a slowed polyurethane reaction is to be achieved or when the reaction mixture is to have enhanced flow in use.

Useful organic acids include, for example, any hereinbelow recited organic acids, for example carboxylic acids having 1 to 36 carbon atoms (aromatic or aliphatic, linear or branched), for example formic acid, lactic acid, 2-ethylhexanoic acid, salicylic acid and neodecanoic acid, or else polymeric acids such as, for example, polyacrylic or polymethacrylic acids. Useful inorganic acids include, for example, phosphorus-based acids, sulphur-based acids or boron-based acids.

The use of compounds of formula (I) that are not quaternized or protonated is particularly preferable for the purposes of this invention, however.

The subject-matter of the invention is described hereinafter by way of example, without any intention of limiting the invention to these illustrative embodiments. Where ranges, general formulae or classes of compounds are indicated in what follows, they shall encompass not just the corresponding ranges or groups of compounds that are explicitly mentioned, but also all sub-ranges and sub-groups of compounds which are obtainable by extraction of individual values (ranges) or compounds. When documents are cited in the context of the present description, the contents thereof, particularly with regard to the subject-matter that forms the context in which the document has been cited, are considered in their entirety to form part of the disclosure-content of the present invention. Unless stated otherwise, percentages are figures in percent by weight. When mean values are reported hereinafter, the values in question are weight averages, unless stated otherwise. When parameters which have been determined by measurement are reported hereinafter, they have been determined at a temperature of 25° C. and a pressure of 101 325 Pa, unless stated otherwise.

Polyurethane (PU) in the context of the present invention refers in particular to a product obtainable by reaction of polyisocyanates and polyols or more generally compounds having isocyanate-reactive groups. Further functional groups in addition to the polyurethane can also be formed in the reaction, examples being uretdiones, carbodiimides, isocyanurates, allophanates, biurets, ureas and/or uretimines. PU in the context of the present invention therefore subsumes not only polyurethane but also polyisocyanurate, polyureas and polyisocyanate reaction products comprising uretdione, carbodiimide, allophanate, biuret and uretimine groups. Polyurethane foam (PU foam) in the context of the present invention refers in particular to a product obtainable by reaction of polyisocyanates and polyols or more generally compounds having isocyanate-reactive groups. Further functional groups in addition to the polyurethane can also be formed in the reaction, examples being uretdiones, carbodiimides, isocyanurates, allophanates, biurets, ureas or uretimines. For the purposes of the present invention, the term PU foams therefore refers both to polyurethane foams (PUR foams) and to polyisocyanurate foams (PIR foams). Preferred polyurethane foams are flexible polyurethane foams, rigid polyurethane foams and integral polyurethane foams. Particular preference herein is given to conventional flexible polyurethane foams based on ether or ester polyol, high-resilience (HR) cold-cure polyurethane foams, viscoelastic polyurethane foams, semi-rigid polyurethane foams and rigid polyurethane foams, and also foams with properties between these classifications and used in the automotive industry.

In one preferred embodiment of the invention, use is made of at least one nitrogenous compound of formula (I), wherein $R_1$ and $R_2$ are hydrogen and $R_3$ is as defined above, wherein the nitrogenous compound of formula (I) comprises in particular at least one compound conforming to formula (II)

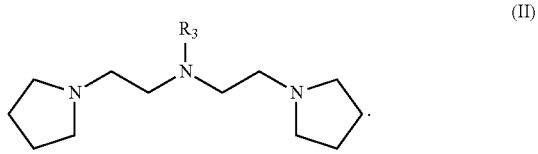

(II)

It is in accordance with a further preferred embodiment of this invention to use at least one compound of formula (I), preferably conforming to formula (II), where

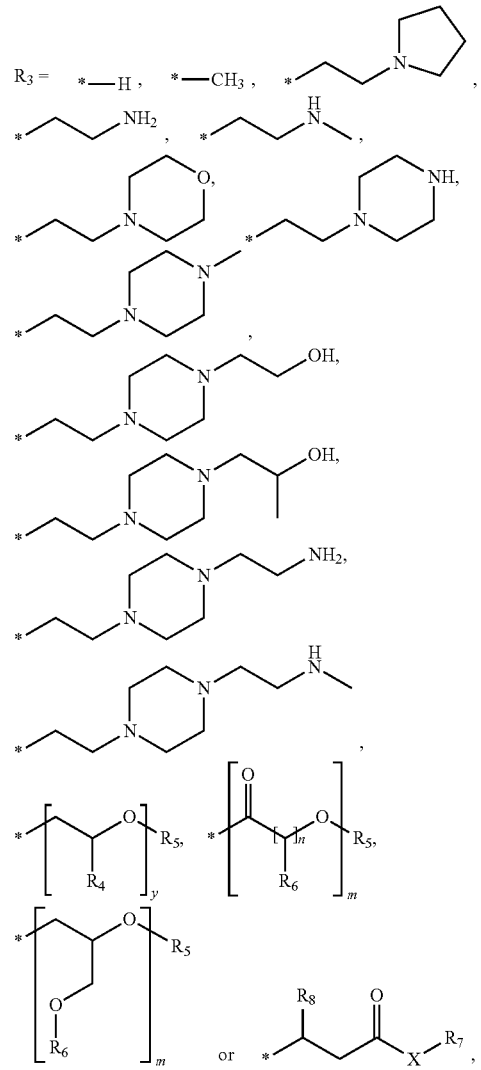

where
m=1 to 20, n=1 to 36, y=1 to 10, preferably 2 to 5,
X=O or NH,
$R_4$=—H, —CH$_3$, —CH$_2$CH$_3$ or phenyl, preferably hydrogen,
$R_5$=—H or -alkyl, preferably $C_1$ to $C_{40}$ alkyl, $C_{1-25}$ organic moiety with ester function(s), urethane function(s) or amide function(s),
preferably H or $C_1$ or $C_6$ to $C_{30}$ alkyl, more preferably hydrogen,
$R_6$=$C_1$ to $C_{22}$ alkyl, aryl or alkylaryl,
$R_7$=H or $C_1$ to $C_{22}$ alkyl, aryl or alkylaryl moiety which may optionally contain OH functions,
$R_8$=H or a moiety of formula (Y):

(Y)

where $R^5$ and X are each as defined above,
wherein $R_3$ is more preferably a moiety selected from the following moieties:

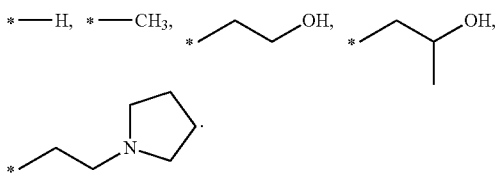

A still further preferred embodiment of this invention utilizes at least one nitrogenous compound of formula (I) that conforms to formula (III), (IV), (V), (VI) or (VII)

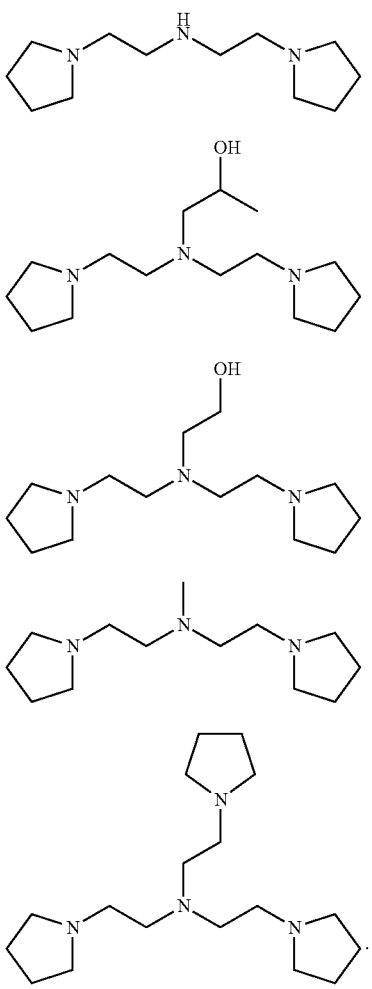

Where reference is made in the context of this invention to at least one nitrogenous compound of the formula (I), (II), (III), (IV), (V), (VI) and/or (VII), this comprises the use of two or more different nitrogenous compounds of formulae (I), (II), (III), (IV), (V), (VI) and/or (VII), e.g. the conjoint use of nitrogenous compounds of formulae (III) and (IV), and also the use of the corresponding protonated compounds and also the use of the corresponding quaternized compounds and also the use of corresponding mixtures of all aforementioned nitrogenous compounds of formulae (I), (II), (III), (IV), (V), (VI) and/or (VII), and of corresponding protonated and/or quaternized compounds.

The above-described nitrogenous compounds according to formulae (I), (II), (III), (IV), (V), (VI) and/or (VII) according to the invention are in principle obtainable via common methods of amine synthesis. A good overview of synthesis and derivatization of amines, for example with ethylene oxide and propylene oxide (alkoxylation), various processes for methylating primary or secondary amines, in particular also the synthesis of pyrrolidine, is described in the article "Amines, Aliphatic" in Ullmann's Encyclopedia of Industrial Chemistry, Wiley-VCH, Weinheim, 2012, Vol. 2, pp. 647-698 (DOI: 10.1002/14356007.a02_001) and the literature references cited therein.

Preferred synthons for the purposes of the present invention are, in particular, amines, polyamines, in particular diamines and triamines, aminoalcohols or hydroxyl-bearing amines, bischloroalkylamines and amino-bearing alkyl chlorides. Preferably used polyamines are, for example, ethylenediamine (EDA) and higher homologues such as diethylenetriamine (DETA) or tris(2-aminoethyl)amine (tren). Preferably used aminoalcohols or hydroxyl-bearing amines are obtainable for example by reaction of ammonia or amines with epoxides (alkoxylation), preferably with ethylene oxide (EO) and/or propylene oxide (PO), and/or by amination of alcohols or polyols, preferably of diols, in particular of glycols such as monoethylene glycol (MEG), with ammonia or amines by known methods, as described for example by Beller et al. in Chem. Asian J. 2007, 2, 403-410, by Milstein et al. in Angew. Chem. 2008, 120, 8789-8792, by Watson and Williams in Science 2010, Vol. 329, pp. 635-636 or by Börner et al. in ChemCatChem 2010, 2, 640-643. Preferred aminoalcohols for the purposes of this invention are, for example, monoethanolamine (MEA), 1-(2-hydroxyethyl)pyrrolidine, diethanolamine (DEOA), triethanolamine, monoisopropanolamine, diisopropanolamine and triisopropanolamine. Aminoalcohols described herein exactly are all commercially available. One example of a bischloroalkylamine is a commercially available bis(2-chloroethyl)amine hydrochloride. Amino-bearing alkyl chlorides are obtainable for example by reaction of bischloroalkyl compounds with one equivalent of an amine, in particular with pyrrolidine (nucleophilic substitution).

The pyrrolidine groups present in all the compounds may be introduced either at the start or at the end, depending on the desired route of synthesis. It may be preferable to use pyrrolidine itself for this, for example by reaction of pyrrolidine with alkyl halides, in particular with alkyl chlorides (nucleophilic substitution), as described for example by Aitken et al. in Tetrahedron, 2002, Vol. 58, 29, pp. 5933-5940 and/or by Tijskens et al. in Journal of Organic Chemistry, 1995, Vol. 60, 26, pp. 8371-8374, and/or by reaction of pyrrolidine with bischloroalkyl ethers, and/or by reaction of pyrrolidine with epoxides (alkoxylation) or epoxy-bearing compounds, especially with ethylene oxide (EO) and/or propylene oxide (PO), as described for example by Reppe et al. in Justus Liebigs Annalen der Chemie, 1955, Vol. 596, p. 1149 or by Moffett et al. in Journal of Organic Chemistry, 1949, Vol. 14, pp. 862-866 and in Org. Synth. Coll., 1963, Vol. IV, p. 834ff, and/or by reaction of pyrrolidine with alcohols and/or polyols, preferably diols, in particular glycols, for example in a transition metal-catalysed mode as described by Jenner et al. in Journal of Organometallic Chemistry, 373 (1989), 343-352. The pyrrolidine function is further also introducible by reaction of 1,4-butanediol with primary amines, for example as again described by Jenner et al. in Journal of Organometallic Chemistry, 373 (1989), 343-352, and/or by reaction of 1,4-butanediol with ammonia and hydroxyl-bearing organic compounds, preferably polyols, in particular diols, preferably glycols such as monoethylene glycol (MEG) and/or aminoalcohols, in particular comprising a primary hydroxyl function as described for example in DE 701825C. The preparation and performance testing of selected compounds of formula (I) according to the invention is illustratively described exactly in the example part.

The particularly preferred compound of formula (III) according to the present invention is obtainable for example in a nucleophilic substitution by reaction of bis(2-chloroethyl)amine hydrochloride with an excess of at least two equivalents of pyrrolidine, as described inter alia in the example part. From this compound of formula (III), the compounds of formulae (IV), (V) and (VI) according to the present invention are obtainable for example either by alkoxylation with propylene oxide (to form the compound of formula (IV)), by alkoxylation with ethylene oxide (to form the compound of formula (V)) or by methylation, as an Eschweiler-Clarke methylation with formaldehyde as methylating agent (to form the compound of formula (IV)), as described inter alia in the example part.

The reductive methylation of primary and secondary amines by use of formaldehyde and formic acid is known as an Eschweiler-Clarke methylation and represents a special case of the Leuckart-Wallach reaction (R. Leuckart, Ber. 18, 2341 (1885), O. Wallach, Ann. 272, 99 (1892)). Descriptions of the Eschweiler-Clarke methylation are found inter alia in W. Eschweiler, Ber. 38, 880 (1905) and H. T. Clarke et al., J. Am. Chem. Soc. 55, 4571 (1933) and also further synthetic applications e.g. also in E. Farkas, C. J. Sunman, J. Org. Chem. 50, 1110 (1985) or J. Casanova, P. Devi, Synth. Commun. 23, 245 (1993). Alternative methods of methylation comprise inter alia the use of methanol, dimethyl sulphate (DMS), dimethyl sulphoxide (DMSO) or of alkyl halides as alkylating agents. The extensive literature regarding such methods, which is known to a person skilled in the art, may be referenced. In addition, a compound of formula (VI) may be obtained, for example, by use of monomethylamine as N-methyl component, for example via transition metal-catalysed, for example by use of Raney metals such as, for example, Raney cobalt or Raney nickel, reaction with hydroxyl-bearing compounds, in the simplest case by reaction with an excess of at least two equivalents of 1-(2-hydroxyethyl)pyrrolidine, which may be obtained by alkoxylation of pyrrolidine with ethylene oxide (EO). Such aminations of alcohols with monomethylamine are extensively described in the literature, for example in U.S. Pat. No. 5,639,916 or DE 4230402. The process conditions here may also lead to the generation of various by-products. The compound of formula (VI) is in this way also alternatively obtainable by proceeding directly from monoethylene glycol (MEG), butanediol, ammonia and monomethylamine.

To prepare compounds of formula (I) or (II) where $R_3$ is other than hydrogen or other than -methyl, a corresponding compound of formula (I) or (II) where $R_3$ is hydrogen (corresponding for example to the compound of formula (III)) can be reacted with suitable reagents for example.

To obtain compounds of formula (I) or (II) where

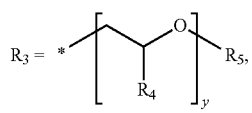

the reagents used can be for example ethylene oxide, propylene oxide, butylene oxide or styrene oxide, for example in line with the methods of preparing compounds of formula (IV) or (V) that are described in the example part.

To obtain compounds of formula (I) or (II) where

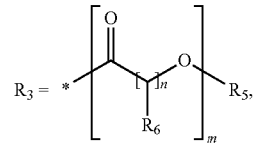

the reagents used can be, for example, hydroxy-carboxylic acids or lactones, for example hydroxystearic acid, lactic acid, butyrolactone or valerolactone.

To obtain compounds of formula (I) or (II) where

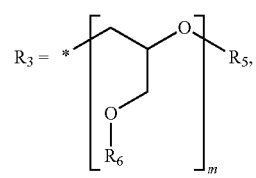

the reagents used can be for example glycidol or glycidyl ether.

To obtain compounds of formula (I) or (II) where

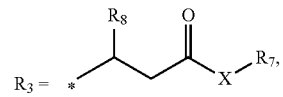

the reagents used can be for example maleic acid derivatives, (meth)acrylic acid derivatives or acrylamide.

Alternatively, the particularly preferred compounds of formula (III), (IV), (V) or (VI), as described hereinbelow using the compound of formula (III) as an example, are also obtainable for example in a nucleophilic substitution from 1-(2-hydroxyethyl)pyrrolidine and 1-(2-chloroethyl)pyrrolidine or in an amination of alcohols by reacting for example diethanolamine (DEOA) with pyrrolidine or a mixture of ammonia and 1,4-butanediol by, for example, heterogeneous, transition metal catalysis, for example by use of Raney metals such as for example Raney cobalt or Raney nickel, or directly by reacting monoethylene glycol (MEG), monoethanolamine (MEA) with pyrrolidine or alternatively a combination of ammonia and 1,4-butanediol. Depending on its method of making, the stringency of the choice of method and the number of purifying steps therein, a nitrogenous compound of formulae (I), (II), (III), (IV), (V), (VI) or (VII), in particular of formula (III), (IV), (V), (VI) or (VII), may be in technical-grade quality, hereinafter also called technical-grade product mixtures, i.e. include for example intermediate and/or by-produced products as secondary constituents and/or further impurities, particularly comprising pyrrolidine, 1-(2-hydroxyethyl)pyrrolidine, 1-(2-chloroethyl)pyrrolidine, 1-(2-aminoethyl)pyrrolidine, 2-(2-(pyrrolidin-1-yl)ethoxy)ethanol, ethylenediamine (EDA), diethylenetriamine (DETA), tris(2-aminoethyl)amine (tren), monoethanolamine (MEA), diethanolamine (DEOA), triethanolamine, 1,4-butanediol, monoethylene glycol (MEG), diethylene glycol (DEG), 2-((2-(pyrrolidin-1-yl)ethyl)amino)ethanol, 2-((3-(pyrrolidin-1-yl)propyl)amino)ethanol, 2,2'-((3-(pyrrolidin-1-yl)propyl)azanediyl)diethanol, 2,2'-((2-(pyrrolidin-1-yl)ethyl)azanediyl)diethanol and/or further piperazinyl- or morpholinyl-containing by-products, in a combined amount of up to 95, preferably ≤70, particularly ≤30, preferably ≤10, more preferably ≤5 wt %. A lower limit may be located for example at ≥0 wt %, or for example at 0.1 wt %. Such technical-grade product mixtures are also useful for the purposes of this invention.

Technical-grade product mixtures in this invention may thus, in addition to the nitrogenous compound of formulae (I), (II), (III), (IV), (V), (VI) and/or (VII), further comprise appreciable amounts of other constituents, for example by-produced and intermediate products and also further impurities.

The use of technical-grade product mixtures, in particular the use of the aforementioned technical-grade product mixture, is also in accordance with a preferred embodiment for the purposes of this invention.

Particularly a use according to the present invention wherein at least one nitrogenous compound of formulae (I), (II), (III), (IV), (V), (VI) and/or (VII), preferably at least one compound of formula (III), (IV), (V), (VI) and/or (VII), is used in the form of a technical-grade product mixture containing impurities and/or secondary constituents in a combined amount of up to 95 wt %, preferably ≤70 wt %, particularly ≤30 wt %, preferably ≤10 wt %, more preferably ≤5 wt %, a lower limit may be located for example at ≥0 wt %, of for example at 0.1 wt %, based on the combined amount of nitrogenous compounds of formulae (I), (II), (III), (IV), (V), (VI) and/or (VII), wherein the impurities and/or secondary constituents comprise in particular pyrrolidine, 1-(2-hydroxyethyl)pyrrolidine, 1-(2-chloroethyl)pyrrolidine, 1-(2-aminoethyl)pyrrolidine, 2-(2-(pyrrolidin-1-yl)ethoxy)ethanol, ethylenediamine (EDA), diethylenetriamine (DETA), tris(2-aminoethyl)amine (tren), monoethanolamine (MEA), diethanolamine (DEOA), triethanolamine, 1,4-butanediol, monoethylene glycol (MEG), diethylene glycol (DEG), 2-((2-(pyrrolidin-1-yl)ethyl)amino)ethanol, 2-((3-(pyrrolidin-1-yl)propyl)amino)ethanol, 2,2'-((3-(pyrrolidin-1-yl)propyl)azanediyl)diethanol, 2,2'-((2-(pyrrolidin-1-yl)ethyl)azanediyl)diethanol, corresponds to a preferred embodiment for the purposes of this invention. Such a preferred technical-grade product mixture is usable with great advantage in the processes and uses of the present invention and makes it possible to solve the stated problem.

Particularly the use of a technical-grade product mixture in the manner of the present invention wherein the technical-grade product mixture contains
(a) at least one nitrogenous compound of formulae (I), (II), (III), (IV), (V), (VI) and/or (VII), preferably at least one compound of formulae (III), (IV), (V), (VI) and/or (VII), advantageously in a combined amount of ≥5 wt %, preferably 20-95 wt %, in particular 30-70 wt %,
(b) optionally 1-(2-hydroxyethyl)pyrrolidine, advantageously in an amount ≥5 wt %, preferably 20-95 wt %, in particular 30-70 wt %,
(c) optionally 1-(2-aminoethyl)pyrrolidine, advantageously in an amount ≥5 wt %, preferably 20-95 wt %, in particular 30-70 wt %,
(d) optionally 2-(2-(pyrrolidin-1-yl)ethoxy)ethanol, advantageously in an amount ≥5 wt %, in particular 20-95 wt %, preferably 30-70 wt %,
(e) optionally 2-((2-(pyrrolidin-1-yl)ethyl)amino)ethanol, 2-((3-(pyrrolidin-1-yl)propyl)amino)ethanol, 2,2'-((3-(pyrrolidin-1-yl)propyl)azanediyl)diethanol, 2,2'-((2-(pyrrolidin-1-yl)ethyl)azanediyl)diethanol, advantageously in an amount ≤95 wt %, in particular 20-90 wt %, preferably 30-80 wt %,
(f) optionally ethylenediamine (EDA), advantageously in an amount ≤95 wt %, in particular 20-90 wt %, preferably 30-80 wt %,
(g) optionally diethylenetriamine (DETA), advantageously in an amount ≤95 wt %, in particular 20-90 wt %, preferably 30-80 wt %,
(h) optionally tris(2-aminoethyl)amine (tren), advantageously in an amount ≤95 wt %, in particular 20-90 wt %, preferably 30-80 wt %,
(i) optionally monoethanolamine (MEA), advantageously in an amount ≤95 wt %, in particular 20-90 wt %, preferably 30-80 wt %,
(j) optionally diethanolamine (DEOA), advantageously in an amount ≤95 wt %, in particular 20-90 wt %, preferably 30-80 wt %,
(k) optionally triethanolamine, advantageously in an amount ≤95 wt %, in particular 20-90 wt %, preferably 30-80 wt %,
(l) optionally 1,4-butanediol, advantageously in an amount ≤95 wt %, in particular 20-90 wt %, preferably 30-80 wt %,
(m) optionally monoethylene glycol (MEG), advantageously in an amount ≤95 wt %, in particular 20-90 wt %, preferably 30-80 wt %, and/or
(n) optionally diethylene glycol (DEG), advantageously in an amount ≤95 wt %, in particular 20-90 wt %, preferably 30-80 wt %,
corresponds to a preferred embodiment of this invention.

Technical-grade product mixtures in the context of the present invention which are particularly preferred for the purposes of the aforementioned preferred embodiment are those compositions using at least one nitrogenous compound of formulae (I), (II), (III), (IV), (V), (VI) and/or (VII) and/or a corresponding quaternized and/or protonated compound in combination
with a), with b), with c), with d), with e), with f), with g), with h), with i), with j), with k), with l), with m), with n), with b and m), with c) and m), with d) and m), with e) and m), with b) and n), with c) and n), with d) and n), with e) and n), with b) and c), with b) and d), with b), c) and d), with b), c) and m), with b), d), and m), with b), c), d), and m), with b), c) and n), with b), d), and n) or in combination with b), c), d), and n).

The above-described compounds of formulae (I), (II), (III), (IV), (V), (VI) and/or (VII) and/or corresponding quaternized and/or protonated compounds are preferably used as catalysts in the manufacture of polyurethane systems in the manner of the present invention, preferably for production of polyurethane coatings, polyurethane adhesives, polyurethane sealants, polyurethane elastomers or, in particular, for production of foamed polyurethane materials. The compounds of formula (I) and/or the corresponding quaternized and/or protonated compounds, when used as catalysts, may be used in addition to customary catalysts or as replacement for customary catalysts. In particular, the compounds of the present invention are useful as replacement for other nitrogenous catalysts, hereinafter also called amine catalysts or amines, and, depending on the application, as partial or complete replacement for customary metal-containing catalysts according to the prior art.

It is accordingly in accordance with a preferred embodiment of the invention to use at least one nitrogenous compound of formulae (I), (II), (III), (IV), (V), (VI) and/or (VII), a correspondingly quaternized and/or protonated compound, or mixtures of the nitrogenous compound of formulae (I), (II), (III), (IV), (V), (VI) and/or (VII) with corresponding quaternized and/or protonated compounds as catalyst in the manufacture of polyurethane systems, in particular foamed polyurethane materials. In particular, the nitrogenous compound referred to may also be used in the form of a technical-grade product mixture. Suitable technical-grade product mixtures are more particularly described hereinbelow.

It will be readily understood that a person skilled in the art seeking to produce the different polyurethane systems, in particular the different types of foamed polyurethane material, for example hot-cure, cold-cure or ester-type flexible polyurethane foams or rigid polyurethane foams, will select the particular substances needed for this, such as isocyanates, polyols, stabilizers, surfactants, etc., appropriately in order to obtain the particular desired type of polyurethane, in particular type of polyurethane foam.

In the manufacture of polyurethane systems, in particular foamed polyurethane materials, in the manner of the present invention, preferably at least one compound of formulae (I), (II), (III), (IV), (V), (VI) and/or (VII) according to the present invention and/or a corresponding quaternized and/or protonated compound, at least one polyol component and at least one isocyanate component are reacted with one another, optionally in the presence of water, physical blowing agents, flame retardants, additional catalysts and/or further added substances.

Further particulars regarding the starting materials, catalysts, auxiliary substances and added substances used are found for example in Kunststoffhandbuch, Volume 7, Polyurethane, Carl-Hanser-Verlag Munich, 1st edition 1966, 2nd edition, 1983 and 3rd edition, 1993. The compounds, components and additives hereinbelow are recited by way of example only and may be replaced and/or supplemented by other chemistries known to a person skilled in the art.

The invention uses the compounds of formulae (I), (II), (III), (IV), (V), (VI) and/or (VII) and/or corresponding quaternized and/or protonated compounds in a combined total amounting to a mass fraction of preferably 0.01 to 20.0 parts (pphp), more preferably 0.01 to 5.00 parts and still more preferably 0.02 to 3.00 parts based on 100 parts (pphp) of polyol component.

In one preferred embodiment of the invention, therefore, the production of a polyurethane system, in particular the production of a polyurethane foam, comprises the preparation of a composition including at least one nitrogenous compound of formulae (I), (II), (III), (IV), (V), (VI) and/or (VII) and/or a corresponding quaternized and/or protonated compound, and further also at least one polyol component, at least one isocyanate component and optionally one or more blowing agents and reacting this composition. In particular, the recited nitrogenous compound can also be used as a technical-grade product mixture. Suitable technical-grade product mixtures are described in greater detail hereinbelow.

Isocyanate components used preferably comprise one or more organic polyisocyanates having two or more isocyanate functions. Polyol components used preferably comprise one or more polyols having two or more isocyanate-reactive groups.

Isocyanate components used for the purposes of this invention are all isocyanates containing two or more isocyanate groups. In general, any aliphatic, cycloaliphatic, arylaliphatic and preferably aromatic polyfunctional isocyanates known per se may be used. Isocyanates are preferably used at from 60 to 350 mol %, more preferably at from 60 to 140 mol %, relative to the sum total of isocyanate-consuming components.

Specific examples are: alkylene diisocyanates having 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate (HMDI), cycloaliphatic diisocyanates, such as cyclohexane 1,3-diisocyanate and 1,4-diisocyanate and also any desired mixtures of these isomers, 1-isocyanato-3,3,5-trimethyl-5-isocyanatomethylcyclohexane (isophorone diisocyanate or IPDI for short), 2,4- and 2,6-hexahydrotolylene diisocyanate and also the corresponding isomeric mixtures, and preferably aromatic di- and polyisocyanates, for example 2,4- and 2,6-tolylene diisocyanate (TDI) and the corresponding isomeric mixtures, mixtures of 2,4'- and 2,2'-diphenylmethane diisocyanates (MDI) and polyphenyl polymethylene polyisocyanates (polymeric MDI) and mixtures of polymeric MDI and tolylene diisocyanates (TDI). Organic di- and polyisocyanates can be used individually or as mixtures thereof.

It is also possible to use isocyanates modified through incorporation of urethane, uretdione, isocyanurate, allophanate and other groups, so-called modified isocyanates.

Particularly suitable organic polyisocyanates, and so used with particular preference, are various isomers of tolylene diisocyanate (2,4- and 2,6-tolylene diisocyanate (TDI), in pure form or as isomeric mixtures differing in composition), 4,4'-diphenylmethane diisocyanate (MDI), the so-called "crude MDI" or "polymeric MDI" (contains the 2,4'- and 2,2'-isomers of MDI as well as the 4,4'-isomer and also more highly nuclear products), and also the binuclear product to which the designation "pure MDI" is applied, which consists predominantly of 2,4'- and 4,4'-isomeric mixtures and/or prepolymers thereof. Examples of particularly suitable isocyanates are recited for example in EP 1712578, EP 1161474, WO 00/58383, US 2007/0072951, EP 1678232 and WO 2005/085310, which are hereby fully incorporated herein by reference.

Polyols used as polyol component for the purposes of the present invention are all organic substances having two or more isocyanate-reactive groups, preferably OH groups, and also preparations thereof. Preferred polyols include any polyether polyols and/or polyester polyols and/or hydroxyl-containing aliphatic polycarbonates, in particular polyether polycarbonate polyols and/or filled polyols (polymer polyols) such a SAN, PUD and PIPA polyols, which contain dispersed solid organic fillers up to a solids content of 40% or more, and/or autocatalytic polyols, which contain catalytically active functional groups, in particular amino groups, and/or natural oil based polyols (NOPs) that are typically used for production of polyurethane systems, in particular foamed polyurethane materials. Polyols typically have a functionality of 1.8 to 8 and number-averaged molecular weights ranging from 500 to 15 000. Polyols having OH numbers in the range from 10 to 1200 mgKOH/g are typically used. Number-averaged molecular weights are typically determined by gel permeation chromatography (GPC), in particular with polypropylene glycol as reference substance and tetrahydrofuran (THF) as eluent. OH numbers are determinable according to DIN 53240:1971-12 in particular.

Polyether polyols are obtainable by known methods, for example by anionic polymerization of alkylene oxides in the presence of alkali metal hydroxides, alkali metal alkoxides or amines as catalysts and by addition of at least one starter molecule, which preferably contains 2 or 3 reactive hydrogen atoms in bonded form, or by cationic polymerization of alkylene oxides in the presence of Lewis acids such as, for example, antimony pentachloride or boron trifluoride etherate, or by double metal cyanide catalysis. Suitable alkylene oxides contain from 2 to 4 carbon atoms in the alkylene moiety. Examples are tetrahydrofuran, 1,3-propylene oxide, 1,2-butylene oxide and 2,3-butylene oxide; ethylene oxide and 1,2-propylene oxide are preferably used. Alkylene oxides may be used singly, cumulatively, blockwise, alternatingly in succession or as mixtures. Starter molecules used include, in particular, compounds having 2 or more, preferably 2 to 8 hydroxyl groups, or having two or more primary amino groups in the molecule. Useful starter molecules include, for example, water, 2-, 3- or 4-hydric alcohols such as ethylene glycol, 1,2-propanediol, 1,3-propanediol, diethylene glycol, dipropylene glycol, glycerol, trimethylolpropane, pentaerythritol, castor oil, etc., higher polyfunctional polyols, in particular sugar compounds such as, for example, glucose, sorbitol, mannitol and sucrose, polyhydric phenols, resols, e.g. oligomeric condensation products of phenol and formaldehyde and Mannich condensates formed from phenols, formaldehyde and dialkanolamines and also melamine, or amines such as aniline, EDA, TDA, MDA and PMDA, more preferably TDA and PMDA. The choice of suitable starter molecule depends on the particular field of use for the resulting polyether polyol in polyurethane production (in that, for example, different polyols are used in the production of flexible polyurethane foams than in the production of rigid polyurethane foams).

Polyester polyols are based on esters of polybasic aliphatic or aromatic carboxylic acids, preferably of 2 to 12 carbon atoms. Examples of aliphatic carboxylic acids are succinic acid, glutaric acid, adipic acid, suberic acid, azelaic acid, sebacic acid, decanedicarboxylic acid, maleic acid and fumaric acid. Examples of aromatic carboxylic acids are phthalic acid, isophthalic acid, terephthalic acid and the isomeric naphthalenedicarboxylic acids. Polyester polyols are obtained by condensing these polybasic carboxylic acids with polyhydric alcohols, preferably diols or triols having 2 to 12, more preferably 2 to 6 carbon atoms, preferably trimethylolpropane and glycerol.

Polyether polycarbonate polyols are polyols containing carbon dioxide in the bonded form of the carbonate. Since many processes in the chemical industry generate carbon dioxide in large amounts as a by-product, the use of carbon dioxide as a comonomer in alkylene oxide polymerizations is of particular interest from a commercial viewpoint. Partial replacement of alkylene oxides in polyols by carbon dioxide has the potential to greatly reduce costs for the production of polyols. The use of $CO_2$ as a comonomer is also very advantageous from an ecological viewpoint, since this reaction represents the conversion of a greenhouse gas into a polymer. The preparation of polyether polycarbonate polyols by addition of alkylene oxides and carbon dioxide onto H-functional starter substances by use of catalysts is well known. Various catalyst systems may be used here: The first generation were heterogenous zinc or aluminium salts, as described for example in U.S. Pat. No. 3,900,424 or 3,953,383. Mono- and binuclear metallic complexes have further been successfully used for copolymerization of CO2 and alkylene oxides (WO 2010/028362, WO 2009/130470, WO 2013/022932 or WO 2011/163133). The most important class of catalyst systems for the copolymerization of carbon dioxide and alkylene oxides is that of the double metal cyanide catalysts, also known as DMC catalysts (U.S. Pat. No. 4,500,704, WO 2008/058913). Suitable alkylene oxides and H-functional starter substances are those also used for preparing carbonate-free polyether polyols, as described above.

Natural oil based polyols (NOPs), i.e. polyols based on renewable raw materials, for producing polyurethane foams, have been the object of increasing interest in view of the fact that the availability of fossil resources, viz. mineral oil, coal and gas, is limited in the long run and against the background of rising crude oil prices, and have already been extensively described in such uses (WO 2005/033167; US 2006/0293400, WO 2006/094227, WO 2004/096882, US 2002/0103091, WO 2006/116456 and EP 1678232). In the meantime, a whole series of these polyols have become commercially available from various producers (WO2004/020497, US2006/0229375, WO2009/058367). Depending on the source of the raw material (e.g. soybean oil, palm oil or castor oil) and the subsequent processing, the polyols obtained differ in their range of properties. Essentially two groups are distinguishable here: a) natural oil based polyols modified such that they are 100% usable for production of polyurethanes (WO2004/020497, US2006/0229375); b) natural oil based polyols which, owing to their processing and properties, are capable of replacing petrochemically based polyol to a certain extent only (WO2009/058367).

A further class of useful polyols is that of the so-called filled polyols (polymer polyols). These contain dispersed solid organic fillers up to a solids content of 40% or more. SAN, PUD and PIPA polyols are among useful polyols. SAN polyols are highly reactive polyols containing a dispersed copolymer based on styrene-acrylonitrile (SAN). PUD polyols are highly reactive polyols containing polyurea, likewise in dispersed form. PIPA polyols are highly reactive polyols containing a dispersed polyurethane, for example formed by in situ reaction of an isocyanate with an alkanolamine in a conventional polyol.

The solids content, which is preferably between 5 and 40%, based on the polyol, depending on the application, is responsible for improved cell opening, and so the polyol can be foamed in a controlled fashion, in particular with TDI, and no shrinkage of the foams occurs. The solid thus acts as an essential processing aid. A further function is to control the hardness via the solids content, since higher solids contents bring about a higher hardness on the part of the foam. The formulations with solids-containing polyols are distinctly less self-stable and therefore tend to require physical stabilization in addition to the chemical stabilization due to the crosslinking reaction. Depending on the solids contents of the polyols, these can be used for example alone or for example in a blend with the abovementioned unfilled polyols.

A further class of useful polyols are those which are obtained as prepolymers via reaction of polyol with isocyanate in a molar ratio of 100:1 to 5:1, preferably 50:1 to 10:1. Such prepolymers are preferably used in the form of a solution in the polyol, and the polyol preferably corresponds to the polyol used for preparing the prepolymers.

A further class of useful polyols is that of the so-called autocatalytic polyols, in particular autocatalytic polyether polyols. Polyols of this type are based, for example, on polyether blocks, preferably on ethylene oxide and/or propylene oxide blocks, and also contain catalytically active functional groups, for example nitrogenous functional groups, in particular amino groups, preferably tertiary amine functions, urea groups and/or heterocycles comprising nitrogen atoms. The use of such autocatalytic polyols in the manufacture of polyurethane systems, in particular in the manufacture of foamed polyurethane materials, preferably in the manufacture of flexible polyurethane foams, makes it possible that the amount needed of any additionally used catalysts may optionally be reduced and/or conformed to specific desired foam properties, depending on the intended use. Suitable polyols are described for example in WO0158976 A1, WO2005063841 A1, WO0222702 A1, WO2006055396 A1, WO03029320 A1, WO0158976 A1, U.S. Pat. No. 6,924,321 B2, U.S. Pat. No. 6,762,274 B2, EP2104696 B1, WO2004060956 A1 or WO2013102053 A1 and are available from Dow under the trade names of Voractiv™ and/or SpecFlex™ Activ for example.

Depending on the properties required of the resulting foams, corresponding polyols can be used, as described for example in: US 2007/0072951 A1, WO 2007/111828, US 2007/0238800, U.S. Pat. No. 6,359,022 or WO 96/12759. Further polyols are known to a person skilled in the art and are derivable for example from EP-A-0380993 or U.S. Pat. No. 3,346,557, which are both hereby fully incorporated herein by reference.

One preferred embodiment of the invention, in particular for production of molded and high-resilience flexible foams, utilizes two- and/or three-functional polyether alcohols having primary hydroxyl groups, preferably above 50%, more preferably above 80%, in particular those having an ethylene oxide block at the chain end. Depending on the properties required by this embodiment, which is preferable according to the present invention, in particular for producing the abovementioned foamed materials, the use of the polyether alcohols described herein is preferably accompanied by the use of further polyether alcohols bearing primary hydroxyl groups and being predominantly based on ethylene oxide, in particular having a >70%, preferably >90%, fraction of ethylene oxide blocks. Polyether alcohols described for the purposes of this preferred embodiment preferably all have the functionality of 2 to 8, more preferably 2 to 5, number-averaged molecular weights ranging from 2500 to 15 000, preferably from 4500 to 12 000, and typically OH numbers in the range from 5 to 80, preferably from 20 to 50 mgKOH/g.

A further preferred embodiment of the invention, in particular for production of flexible slabstock foam, utilizes two- and/or three-functional polyether alcohols having secondary hydroxyl groups, preferably above 50%, more preferably above 90%, in particular those having a propylene oxide block or random propylene oxide and ethylene oxide block at the chain end, or those based exclusively on propylene oxide blocks. Polyether alcohols of this type preferably have a functionality of 2 to 8, more preferably 2 to 4, number-averaged molecular weights ranging from 500 to 8000, preferably from 800 to 5000, more preferably from 2500 to 4500, and typically OH numbers in the range from 10 to 100, preferably from 20 to 60 mgKOH/g.

A further preferred embodiment of the invention, in particular for production of foamed polyurethane materials, preferably for production of flexible polyurethane foams, more preferably for production of molded and high-resilience flexible foams, utilizes autocatalytic polyols as described above.

A further preferred embodiment of the invention, in particular for production of polyester-type flexible polyurethane foams, utilizes polyester alcohols based on diols and/or triols, preferably glycerol and/or trimethylolpropane, and aliphatic carboxylic acids, preferably adipic acid, suberic acid, azelaic acid and/or sebacic acid. Polyester alcohols of this type preferably have a functionality of 2 to 4, more preferably 2 to 3, number-averaged molecular weights in the range of 200-4000, preferably 400-3000, more preferably 600-2500, and typically OH numbers in the range of 10-1000, preferably 20-500, more preferably 30-300 mgKOH/g.

A further preferred embodiment of the invention, in particular for production of rigid polyisocyanurate (PIR) foams, utilizes polyester alcohols based on diols and/or triols, preferably monoethylene glycol, and aromatic carboxylic acids, preferably phthalic acid and/or terephthalic acid. Polyester alcohols of this type preferably have a functionality of 2 to 4, more preferably 2 to 3, number-averaged molecular weights in the range of 200-1500, preferably 300-1200, more preferably 400-1000, and typically OH numbers in the range of 100-500, preferably 150-300, more preferably 180-250 mgKOH/g.

A further preferred embodiment of the invention, in particular for production of rigid polyurethane foams, utilizes two- to eight-functional polyether alcohols having secondary hydroxyl groups, preferably above 50%, more preferably above 90%, in particular those having a propylene oxide block or random propylene oxide and ethylene oxide block at the chain end or those based exclusively on propylene oxide blocks. Polyether alcohols of this type preferably have a functionality of 2 to 8, more preferably 3 to 8, number-averaged molecular weights ranging from 500 to 2000, preferably from 800 to 1200, and typically OH numbers in the range from 100 to 1200, preferably 120 to 700, more preferably 200 to 600 mgKOH/g. Depending on the properties required of these foams, which are preferable according to the present invention, the use of the polyols described herein is accompanied by the additional use of polyether alcohols as described above with comparatively high number-averaged molecular weights and comparatively low OH numbers, and/or additional polyester polyols, as described above on the basis of aromatic carboxylic acids.

A further preferred embodiment of the invention, in particular for production of viscoelastic polyurethane foams, preferably utilizes mixtures of various, preferably of two or of three, polyfunctional polyester alcohols and/or polyether alcohols. Typically, the polyol combinations used herein consist of a low molecular weight crosslinker polyol, for example a rigid foam polyol, of high functionality (>3) and/or a conventional high molecular weight slabstock flexible foam or HR polyol, and/or a hypersoft polyether polyol having a high fraction of ethylene oxide blocks and having cell-opening properties.

A preferred ratio between isocyanate and polyol, expressed as the index of the formulation, i.e. as stoichiometric ratio of isocyanate groups to isocyanate-reactive groups (e.g. OH groups, NH groups) multiplied by 100, is in the range from 10 to 1000, preferably in the range from 40 to 350, more preferably in the range from 70 to 140. An index of 100 represents a molar ratio of 1:1 for the reactive groups.

Depending on the intended application, it may be preferable for the purposes of the present invention for additional catalysts to be used alongside the nitrogenous compounds of formulae (I), (II), (III), (IV), (V), (VI) and/or (VII) according to the present invention, and/or corresponding protonated and/or quaternized compounds, these additional catalysts being used singly during the foaming or in the form of a catalyst combination premixed with the nitrogenous compounds of formulae (I), (II), (III), (IV), (V), (VI) and/or (VII) according to the present invention, and/or corresponding protonated and/or quaternized compounds.

The expression "additional catalysts" is to be understood for the purposes of this invention as comprehending particularly the use of compounds other than the nitrogenous compounds of formulae (I), (II), (III), (IV), (V), (VI) and/or (VII) according to the present invention, corresponding protonated and/or quaternized compounds, yet also capable of catalysing isocyanate reactions, in particular the hereinbelow recited reactions, and/or of use as catalysts, co-catalysts or activators in the manufacture of polyisocyanate reaction products, in particular in the manufacture of polyurethane systems, more preferably in the manufacture of foamed polyurethane materials.

The expression "catalyst combination premixed", hereinafter also referred to as catalyst combination, is to be understood for the purposes of this invention as comprehending in particular ready-produced mixtures of nitrogenous compounds of formulae (I), (II), (III), (IV), (V), (VI) and/or (VII) according to the present invention, or of corresponding protonated and/or quaternized compounds, additional catalysts, and also optionally still further ingredient or added-substance materials such as, for example, water, organic solvents, acids to block the amines, emulsifiers, surfactants, blowing agents, antioxidants, flame retardants, stabilizers and/or siloxanes, preferably polyether siloxanes, which are already present as such prior to the foaming operation and need not be admixed as individual components during the foaming operation.

Additional catalysts useful in the context of this invention include, for example, any catalysts for the reactions of isocyanate with polyol (urethane formation) and/or isocyanate with water (amine and carbon dioxide formation) and/or isocyanate dimerization (uretdione formation), isocyanate trimerization (isocyanurate formation), isocyanate with isocyanate under $CO_2$ detachment (carbodiimide formation) and/or isocyanate with amine (urea formation) and/or "secondary" crosslinking reactions such as isocyanate with urethane (allophanate formation) and/or isocyanate with urea (biuret formation) and/or isocyanate with carbodiimide (uretimide formation).

Suitable additional catalysts for the purposes of the present invention include, for example, substances that catalyse one of the aforementioned reactions, in particular the gelling reaction (isocyanate with polyol), the blowing reaction (isocyanate with water) and/or the di- or trimerization of isocyanate. Catalysts of this type are preferably nitrogenous compounds, in particular amines and ammonium salts, and/or metal-containing compounds.

Nitrogenous compounds useful as additional catalysts for the purposes of the present invention are all nitrogenous compounds according to the prior art, i.e. other than the nitrogenous compounds of formulae (I) to (VII) according to the present invention, that are capable of catalysing one of the abovementioned isocyanate reactions and/or of use in the manufacture of polyurethanes, in particular foamed polyurethane materials.

The expression "nitrogenous compounds of formula (I)" is to be understood for the purposes of this invention as respectively comprehending the corresponding protonated and/or quaternized compounds and also mixtures thereof. The expression "nitrogenous compounds of formulae (I), (II), (III), (IV), (V), (VI) and/or (VII)" is to be understood for the purposes of this invention as respectively comprehending the corresponding protonated and/or quaternized compounds and also mixtures thereof. The expression "at least one nitrogenous compound of formulae (I), (II), (III), (IV), (V), (VI) and/or (VII)" is to be understood for the purposes of this invention as also comprehending the conjoint use of such nitrogenous compounds, i.e. for instance the conjoint use of nitrogenous compounds of formulae (III) and (IV).

Examples of additional nitrogenous compounds useful as catalysts for the purposes of the present invention are the amines triethylamine, N,N-dimethylcyclohexylamine, N,N-dicyclohexylmethylamine, N,N-dimethylaminoethylamine, N,N,N',N'-tetramethylethylene-1,2-diamine, N,N,N',N'-tetramethylpropylene-1,3-diamine, N,N,N',N'-tetramethyl-1,4-butanediamine, N,N,N',N'-tetramethyl-1,6-hexanediamine, N,N,N',N'',N''-pentamethyldiethylenetriamine, N,N,N'-trimethylaminoethylethanolamine, N,N-dimethylaminopropylamine, N,N-diethylaminopropylamine, 1-(2-aminoethyl)pyrrolidine, 1-(3-aminopropyl)pyrrolidine, N,N-dimethylaminopropyl-N',N'-dipropan-2-olamine, 2-[[3-(dimethylamino)propyl]methylamino]ethanol, 3-(2-dimethylamino)ethoxy)propylamine, N,N-bis[3-(dimethylamino)propyl]amine, N,N,N',N'',N''-pentamethyldipropylenetriamine, 1-[bis[3-(dimethylamino)propyl]amino]-2-propanol, N,N-bis[3-(dimethylamino)propyl]-N',N'-dimethylpropane-1,3-diamine, triethylenediamine, 1,4-diazabicyclo[2.2.2]octane-2-methanol, N,N'-dimethylpiperazine, 1,2-dimethylimidazole, N-(2-hydroxypropyl)imidazole, 1-isobutyl-2-methylimidazole, N-(3-aminopropyl)imidazole, N-methylimidazole, N-ethylmorpholine, N-methylmorpholine, 2,2,4-trimethyl-2-silamorpholine, N-ethyl-2,2-dimethyl-2-silamorpholine, N-(2-aminoethyl)morpholine, N-(2-hydroxyethyl)morpholine, 2,2'-dimorpholinodiethyl ether, N,N'-dimethylpiperazine, N-(2-hydroxyethyl)piperazine, N-(2-aminoethyl)piperazine, N,N-dimethylbenzylamine, N,N-dimethylaminoethanol, N,N-diethylaminoethanol, 1-(2-hydroxyethyl)pyrrolidine, 3-dimethylamino-1-propanol, 1-(3-hydroxypropyl)pyrrolidine, N,N-dimethyl aminoethoxyethanol, N,N-diethylaminoethoxyethanol, bis(2-dimethylaminoethyl ether), N,N,N'-trimethyl-N'-(2-hydroxyethyl)bis(2-aminoethyl) ether, N,N,N'-trimethyl-N-3'-aminopropyl(bisaminoethyl) ether, tris(dimethylaminopropyl)hexahydro-1,3,5-triazine, 1,8-diazabicyclo[5.4.0]undec-7-ene, 1,5-diazabicyclo[4.3.0]non-5-ene, 1,5,7-triazabicyclo[4.4.0]dec-5-ene, N-methyl-1,5,7-triazabicyclo[4.4.0]dec-5-ene, 1,4,6-triazabicyclo[3.3.0]oct-4-ene, 1,1,3,3-tetramethylguanidine, tert-butyl-1,1,3,3-tetramethylguanidine, guanidine, 3-dimethylaminopropylurea, 1,3-bis[3-(dimethylamino)propyl]urea, bis-N,N-(dimethylaminoethoxyethyl)isophorone dicarbamate, 3-dimethylamino-N,N-dimethylpropionamide and 2,4,6-tris(dimethylaminomethyl)phenol. Suitable additional nitrogenous catalysts, according to the prior art, are commercially available from Evonik under the trade name of TEGOAMIN® for example.

Metal-containing compounds useful as additional catalysts for the purposes of the present invention are any prior art metal-containing compounds capable of catalysing one of the abovementioned isocyanate reactions and/or of use in the manufacture of polyurethanes, in particular in the manufacture of foamed polyurethane materials, alongside the nitrogenous compounds of formulae (I) to (VII) according to the present invention. They are selectable for example from the group of metal-organic or organometallic compounds, metal-organic or organometallic salts, organic salts of metals, inorganic salts of metals and also from the group of charged or uncharged metal-containing coordination compounds, in particular metal-chelate complexes.

The expression "metal-organic or organometallic compounds" is to be understood for the purposes of this invention as comprehending in particular the use of metal-containing compounds having a direct carbon-metal bond, also referred to herein as metal-organyls (e.g. tin-organyls) or organometallic or organometal compounds (e.g. organotin compounds). The expression "organometallic or metal-organic salts" is to be understood for the purposes of this invention as comprehending in particular the use of metal-organic or organometallic compounds of salt character, i.e. ionic compounds wherein either the anion or the cation is metal-organic in nature (e.g. organotin oxides, organotin chlorides or organotin carboxylates). The expression "organic salts of metals" is to be understood for the purposes of this invention as comprehending in particular the use of metal-containing compounds that do not have a direct carbon-metal bond but at the same time are metal salts wherein either the anion or the cation is an organic compound (e.g. tin(II) carboxylates). The expression "inorganic salts of metals" is to be understood for the purposes of this invention as comprehending in particular the use of metal-containing compounds or of metal salts wherein neither the anion nor the cation is an organic compound, e.g. metal chlorides (e.g. tin(II) chloride), pure or mixed, i.e. multimetal-containing, metal oxides (e.g. tin oxides) and/or metal silicates or aluminosilicates. The expression "coordination compound" is to be understood for the purposes of this invention as comprehending in particular the use of metal-containing compounds constructed of one or more central entities and one or more ligands, wherein the central entities are charged or uncharged metals (e.g. metal- or to be more precise tin-amine complexes). The expression "metal-chelate complexes" is to be understood for the purposes of this invention as comprehending in particular the use of metal-containing coordination compounds wherein the ligands have at least two sites for coordinating or binding with the metal centre (e.g. metal- or to be more precise tin-polyamine or metal- or to be more precise tin-polyether complexes).

Suitable metal-containing compounds, in particular as above defined, for use as additional catalysts for the purposes of the present invention are selectable for example from all metal-containing compounds comprising lithium, sodium, potassium, magnesium, calcium, scandium, yttrium, titanium, zirconium, vanadium, niobium, chromium, molybdenum, tungsten, manganese, cobalt, nickel, copper, zinc, mercury, aluminium, gallium, indium, germanium, tin, lead, and/or bismuth, in particular sodium, potassium, magnesium, calcium, titanium, zirconium, molybdenum, tungsten, zinc, aluminium, tin and/or bismuth, more preferably tin, bismuth, zinc and/or potassium.

Suitable inorganic salts of metals, in particular as defined above, for use as additional catalysts for the purposes of the present invention are selectable, for example, from the group of salts of inorganic acids such as, for example, hydrochloric acid, carbonic acid, sulphuric acid, nitric acid and phosphoric acid and/or of further halogenated acids. The resulting inorganic salts of metals, for example metal chlorides, metal sulphates, metal phosphates, preferably metal chlorides such as tin(II) chloride, are generally useful in the manufacture of polyurethane systems, in particular in the manufacture of foamed polyurethane materials, only in combination with other metal-organic salts, organic salts of metals or nitrogenous catalysts and not as sole catalysts, in pure form or blended in a solvent.

Suitable charged or uncharged metal-containing coordination compounds, in particular metal-chelate complexes, in particular as defined above, for use as additional catalysts for the purposes of the present invention, are selectable for example from the group of mono- or polynuclear metal-amine, metal-polyamine, metal-polyether, metal-polyester and/or metal-polyamine-polyether complexes. Complexes of this type may be formed either in situ during the foaming and/or before the foaming, or used as isolated complexes, in pure form or blended in a solvent. Useful complexing agents, ligands and/or ligand chelators include, for example, acetylacetone, benzoylacetone, trifluoroacetylacetone, ethyl acetoacetate, salicylaldehyde, salicyladehydeimine and other Schiff bases, cyclopentanone-2-carboxylate, pyrrolidones such as, for example, N-methyl-2-pyrrolidone, N-ethyl-2-pyrrolidone and polyvinylpyrrolidones (various molecular weight distributions), polyethers in various molecular weights, cyclic polyethers such as, for example, crown ethers and diamines and polyamines comprising primary, secondary and/or tertiary amines.

Suitable metal-containing coordination compounds include, for example, any metal acetylacetonates such as nickel(II) acetyl acetonate, zinc(II) acetylacetonate, copper (II) acetylacetonate, molybdenum dioxoacetylacetonate, any iron acetylacetonates, any cobalt acetylacetonates, any zirconium acetylacetonates, any titanium acetylacetonates, any bismuth acetylacetonates and any tin acetylacetonates.

Suitable metal-organic salts and organic salts of metals, in particular as defined above, for use as additional catalysts for the purposes of the present invention are selectable for example from the group of salts of organic acids.

The expression "organic acids" is to be understood for the purposes of this invention as comprehending any organo-chemical, i.e. carbon-containing, compounds having a functional group capable of reacting with water and other protonatable solvents in an equilibrium acid-base reaction.

Suitable organic acids are selectable for example from the group of carboxylic acids, i.e. organic compounds bearing one or more carboxyl groups (*—COOH)—they are known as carboxylates—and/or of alcohols, i.e. organic compounds bearing one or more hydroxyl groups (*—OH)—they are known as alkoxides—and/or of thiols, i.e. organic compounds bearing one or more thiol groups (*—SH, also known as mercapto groups in the case of molecules with a functional group of higher priority)—they are known as thiolates (or mercaptides)—and/or of mercaptoacetic esters as special kinds of thiols, i.e. organic compounds bearing one or more mercaptoacetic ester groups (*—O—CO—CH$_2$—CH$_2$—SH)—known as mercaptoacetates—and/or of sulphuric esters, i.e. organic compounds bearing one or more sulphate groups (*—O—SO$_3$H)—known as sulphates—and/or of sulphonic acids, i.e. organic compounds bearing one or more sulphonic acid groups (*—SO$_2$—OH)—they are known as sulphonates—and/or of phosphoric esters (alkyl phosphates), i.e. organic compounds that are mono- or dibasic alkyl esters of orthophosphoric acid (*—O—PO (OH)$_2$ or *—O—PO(OR)OH), they are known as phosphates, and/or of phosphonic acids, i.e. organic compounds bearing one or more phosphonic acid groups (*—PO (OH)$_2$)—they are known as phosphonates—and/or phosphorous esters, organic compounds that are alkyl esters of phosphonic acid (*—P(OR)$_2$(OH) or *—P(OR)(OH)$_2$), they are known as phosphites.

Suitable carboxylic acids for the purposes of the present invention include, for example, any linear, branched or cyclic, aliphatic or aromatic, saturated or unsaturated mono-, di- or polycarboxylic acids optionally substituted with one or more heteroatoms, preferably with hydroxyl groups (*—OH), primary, secondary or tertiary amino groups (*—NH$_2$, *—NHR, *—NR$_2$) or mercapto groups (*—SH), or interrupted by one or more heteroatoms. Particularly suitable for the purposes of the present invention are carboxylic acids where the carbonyl carbon atom has attached to it a hydrogen atom or a linear, branched or cyclic, aliphatic saturated or unsaturated hydrocarbyl moiety optionally substituted with one or more heteroatoms, preferably with hydroxyl groups (*—OH), primary, secondary or tertiary amino groups (*—NH$_2$, *—NHR, *—NR$_2$) or mercapto groups (*—SH), or interrupted by one or more heteroatoms. Particularly suitable for the purposes of the present invention are such aliphatic carboxylic acids having in the 2-position, i.e. on the carbon atom next to the carbonyl function, disubstituted (tertiary) or trisubstituted (quaternary) carbons and/or corresponding hydrocarbyl moieties. Preferred for the purposes of the present invention are such aliphatic carboxylic acids having one or two methyl, ethyl, n-propyl, isopropyl, n-butyl and/or isobutyl branches in the 2-position. Particularly preferred for the purposes of the present invention are such aliphatic carboxylic acids, in particular monocarboxylic acids, which, in addition to the described branching in the 2-position, have a saturated or unsaturated, linear or branched alkyl chain and are optionally substituted with one or more heteroatoms, preferably with hydroxyl groups (*—OH), primary, secondary or tertiary amino groups (*—NH$_2$, *—NHR, *—NR$_2$) or mercapto groups (*—SH). Suitable carboxylic acids are selectable in particular from the group of neoacids and/or Koch acids.

Examples of suitable mono-, di- and polybasic, saturated and unsaturated substituted and non-substituted carboxylic acids, fatty acids and neoacids and/or Koch acids include carboxylic acids such as formic acid, acetic acid, propionic acid, propionic acids, acrylic acid, butyric acid, isobutyric acid, 2,2-dimethylbutyric acid, valeric acid, isovaleric acid, 2-methylvaleric acid, 2,2-dimethylvaleric acid (isoheptanoic acid), pivalic acid, caproic acid, 2-ethylhexanoic acid (isooctanoic acid), enanoic acid, caprylic acid, pelargonic acid, isononanoic acid, 3,5,5-trimethylhexanoic acid, 2,5,5-trimethylhexanoic acid, 4,5,5-trimethylhexanoic acid, 2,2,4,4-tetramethylpentanoic acid, 6,6-dimethylheptanoic acid, capric acid, neodecanoic acid, 7,7-dimethyloctanoic acid, 2,2-dimethyloctanoic acid, 2,4-dimethyl-2-isopropylpentanoic acid, 2,2,3,5-tetramethylhexanoic acid, 2,2-diethylhexanoic acid, 2,5-dimethyl-2-ethylhexanoic acid, undecanoic acid, lauric acid, tridecanoic acid, neotridecanoic acid, myristic acid, pentadecanoic acid, palmitic acid, margaric acid, stearic acid, oleic acid, linoleic acid, alpha-linolenic acid, phytanic acid, icosenoic acid, erucic acid, ricinoleic acid, vernolic acid, arachidic acid, arachidonic acid, oxalic acid, glycolic acid, glyoxalic acid, malonic acid, lactic acid, citric acid, succinic acid, fumaric acid, maleic acid, malic acid, tartaric acid, glutaric acid, adipic acid, sorbic acid, cinnamic acid, salicylic acid, benzoic acid, terephthalic acid, phthalic acid, isophthalic acid, nicotinic acid, carbamic acid, pyrrolidine-2-carboxylic acid and cyclohexanecarboxylic acid.

Suitable alcohols include any linear, branched or cyclic, aliphatic or aromatic, saturated or unsaturated monohydric alcohols, dihydric alcohols (diols) and/or polyhydric alcohols (polyols) optionally substituted with one or more heteroatoms, preferably with primary, secondary or tertiary amino groups (*—NH$_2$, *—NHR, *—NR$_2$) or mercapto groups (*—SH) or interrupted by one or more heteroatoms. Suitable for this are, for example, methanol, ethanol, propanol, isopropanol, butanol, tert-butanol, neopentyl alcohol, phenols and/or nonylphenol.

Suitable thiols, mercaptoacetic esters, sulphuric esters, sulphonic acids, phosphoric esters (alkyl phosphates), phosphonic acids and/or phosphorous esters include, for example, any linear, branched or cyclic, aliphatic or aromatic, saturated or unsaturated organic compounds comprising one or more corresponding functional groups as defined above and optionally substituted with one or more heteroatoms or interrupted by one or more heteroatoms. Suitable for this are for example dialkyl phosphites, methanesulphonic acid, trifluoromethanesulphonic acid, p-toluenesulphonic acid, dodecylbenzenesulphonic acid, taurine, isooctyl mercaptoacetate, 2-ethylhexyl mercaptoacetate, ethanethiol and/or n-lauryl mercaptide.

Particularly suitable metal-organic salts and organic salts of metals, as defined above, for use as additional catalysts for the purposes of the present invention include, for example, organotin, tin, zinc, bismuth and potassium salts, in particular corresponding metal carboxylates, alkoxides, thiolates and mercaptoacetates, for example dibutyltin diacetate, dimethyltin dilaurate, dibutyltin dilaurate (DBTDL), dioctyltin dilaurate (DOTDL), dimethyltin dineodecanoate, dibutyltin dineodecanoate, dioctyltin dineodecanoate, dibutyltin dioleate, dibutyltin bis(n-lauryl mercaptide), dimethyltin bis(n-lauryl mercaptide), monomethyltin tris(2-ethylhexyl mercaptoacetate), dimethyltin bis(2-ethylhexyl mercaptoacetate), dibutyltin bis(2-ethylhexyl mercaptoacetate), dioctyltin bis(isooctyl mercaptoacetate), tin(II) acetate, tin(II) 2-ethylhexanoate (tin(II) octoate), tin(II) isononanoate (tin(II) 3,5,5-trimethylhexanoate), tin(II) neodecanoate, tin(II) ricinoleate, zinc(II) acetate, zinc(II) 2-ethylhexanoate (zinc(II) octoate), zinc(II) isononanoate (zinc (II) 3,5,5-trimethylhexanoate), zinc(II) neodecanoate, zinc (II) ricinoleate, bismuth acetate, bismuth 2-ethylhexanoate, bismuth octoate, bismuth isononanoate, bismuth neodecanoate, potassium formate, potassium acetate, potassium 2-ethylhexanoate (potassium octoate), potassium isononanoate, potassium neodecanoate and/or potassium ricinoleate.

It may be preferable to foreclose the use of metal-organic salts such as, for example, dibutyltin dilaurate from the manufacture of polyurethanes in the manner of the present invention depending on the intended application, in particular from the production of foamed polyurethane materials.

Suitable additional metal-containing catalysts, in general, are preferably selected such that they have no noticeable intrinsic odour and are toxicologically essentially unconcerning, and that the resulting polyurethane systems, in particular polyurethane foams, have very low catalyst-based emissions.

Besides additional amines and metal-containing compounds, ammonium salts are also usable as additional catalysts. Ammonium formate and/or ammonium acetate are suitable for example.

Suitable additional catalysts are, for example, mentioned in DE 102007046860, EP 1985642, EP 1985644, EP 1977825, US 2008/0234402, EP 0656382 B1 and US 2007/0282026 A1 and the patent documents cited therein.

The amounts in which these additional catalysts are suitably used depend on the type of catalyst and preferably range from 0.01 to 10.0 pphp, more preferably from 0.02 to 5.00 pphp (parts by weight per 100 parts by weight of polyol), or from 0.10 to 10.0 pphp in the case of potassium salts.

Depending on the particular application, it may be preferable for the purposes of the present invention when the use of additional catalysts and/or of premixed catalyst combinations as defined above results in a molar-amount ratio of 1:0.05 to 0.05:1, preferably 1:0.07 to 0.07:1 and more preferably 1:0.1 to 0.1:1 for the sum total of all nitrogenous compounds used, i.e. the sum total of nitrogenous compounds of formulae (I), (II), (III), (IV), (V), (VI) and/or (VII) according to the present invention and of the additional nitrogenous catalysts according to the prior art, relative to the sum total of metal-containing catalysts, in particular potassium, zinc and/or tin catalysts.

It may be preferable for the purposes of the present invention for additional catalysts and/or premixed catalyst combinations, as defined above, to be free of dimethylamine-bearing nitrogenous compounds. catalyst combinations are preferably free of dimethylamine-bearing nitrogenous compounds for the purposes of this invention when less than 75 wt %, in particular less than 50 wt %, preferably less than 30 wt % and more preferably less than 10 wt % of the catalysts in the catalytic mixture comprises dimethylamine-bearing nitrogenous compounds. It is particularly preferable for catalyst combinations not to contain any amount at all, i.e. 0 wt %, of dimethylamine-bearing nitrogenous compounds.

To avoid any reaction between the components, in particular any reaction of—used according to the present invention—nitrogenous compounds of formulae (I), (II), (III), (IV), (V), (VI) and/or (VII) and/or additional nitrogenous catalysts with additional metal-containing catalysts, in particular potassium, zinc and/or tin catalysts, it may be preferable for these components to be stored separately from each other and then added to the isocyanate and polyol reaction mixture concurrently or in succession.

In a preferred embodiment of the invention, the use according to the invention utilizes at least one nitrogenous compound of formulae (I), (II), (III), (IV), (V), (VI) and/or (VII), a corresponding quaternized and/or protonated compound in combination with
   a) one or more additional nitrogenous compounds (i.e., not in accordance with the present invention) as additional catalysts, preferably as defined and illustratively described above,
   b) one or more additional metal-containing catalysts, in particular one or more tin, zinc, bismuth and/or potassium compounds, preferably as defined and illustratively described above,
   c) one or more acids to block the amines present, preferably as described above,
   d) water
   e) one or more organic solvents, preferably as defined and illustratively described hereinbelow,
   f) one or more chemical or physical blowing agents, preferably as described hereinbelow,
   g) one or more stabilizers against oxidative degradation, for example antioxidants, preferably as described hereinbelow,
   h) one or more flame retardants, preferably as described hereinbelow, and/or
   i) one or more foam stabilizers based on siloxanes and/or polydialkylsiloxane-polyoxyalkylene copolymers, preferably as defined and described hereinbelow, and/or
   j) one or more further added substances, for example as selected from the group of surfactants, biocides, dyes, pigments, fillers, antistats, crosslinkers, chain extenders, cell openers, and/or scents, wherein the preparation of the polyurethane, in particular the preparation of the foamed polyurethane material, is advantageously preceded by a composition being prepared, for example in the sense of the individual components being premetered in the mixing head or as premixed catalyst combination, as defined above, comprising the aforementioned combination. In particular, the recited nitrogenous compound of formulae (I), (II), (III), (IV), (V), (VI) and/or (VII) is also usable as a technical-grade product mixture. Suitable technical-grade product mixtures are elucidated in the description.

Combinations in the context of the present invention which are particularly preferred for the purposes of the aforementioned preferred embodiment are those compositions using at least one nitrogenous compound of formulae (I), (II), (III), (IV), (V), (VI) and/or (VII), a corresponding quaternized and/or protonated compound in combination with a), with b), with c), with d), with e), with f), with a), b), c), d) e) and f), with a) and b), with a) and c), with a), b) and c), with a), b) and d), with a), b) and e), with a), b), d) and e), with a), b), d), e) and f), with a), b), e) and f), with a), c) and d), with a), c) and e), with a), c), d) and e), with a), b) and e), with a), b), c) and e), with a), b), c), d) and e), with c) and d), with c) and e), with c), d) and e), with c), e) and f), with c), d), e) and f), with c), d), e) and f), with b) and c), with b), c) and d), with b), c) and e), with b), c), d) and e), with b), c), e) and f), with b), c), d), e), f), with b) and d), with b) and e), with b), d) and e), with b), d) and f), with b), e) and f), or with b), d), e) and f).

The compounds of formulae (I), (II), (III), (IV), (V), (VI) and/or (VII) according to the present invention, the corresponding protonated and/or quaternized compounds are usable as pure substance or in admixture, for example with suitable solvents and/or further added-substance materials individually during the foaming or as premixed catalyst combination as defined above.

Solvents may be any substances suitable according to the prior art. Aprotic apolar, aprotic polar and protic solvents are usable depending on the particular application. Suitable aprotic apolar solvents are selectable for example from the following classes of substances and/or substance classes comprising the following functional groups: aromatic hydrocarbons, aliphatic hydrocarbons (alkanes (paraffins) and olefins), carboxylic esters and polyesters, (poly)ethers and/or halogenated hydrocarbons of low polarity. Suitable aprotic polar solvents are selectable for example from the following classes of substances or substance classes comprising the following functional groups: ketones, lactones, lactams, nitriles, carboxamides, sulphoxides and/or sulphones. Suitable protic solvents are selectable for example from the following classes of substances or substance classes comprising the following functional groups: alcohols, polyols, (poly)alkylene glycols, amines, carboxylic acids, in particular fatty acids and/or primary and secondary amides.

Preferred solvents include, for example, mineral oils, hexane, pentane, heptane, decane or mixtures of saturated hydrocarbons, for example Kaydol products from Sonneborn, glycol ethers such as ethylene glycol dimethyl ether (monoglyme), bis(2-methoxyethyl) ether (diglyme), triethylene glycol dimethyl ether (triglyme), tetraethylene glycol dimethyl ether (tetraglyme), polyester polyols, polyether polyols, natural oil based polyols (NOPs), endcapped polyethers, preferably dialkyl polyethers where the alkyl moieties are butyl/methyl, methyl/methyl or butyl/butyl moieties, preferably those obtainable from diol-started polyethers; glycols, glycerol, carboxylic esters, preferably fatty acid esters, for example ethyl acetate and isopropyl myristate, polycarbonates, phthalates, preferably dibutyl phthalate (DBP), dioctyl phthalate (DNOP), diethylhexyl phthalate (DEHP), diisononyl phthalate (DINP), dimethyl phthalate (DMP), diethyl phthalate (DEP), cyclohexanoates, preferably diisononyl cyclohexanoate (DINCH).

Solvents which are particularly preferred are compounds which are readily processable in the foaming operation and which do not have an adverse effect on the properties of the foam. For instance, isocyanate-reactive compounds are suitable, since they co-react into the polymer matrix and do not generate any emissions in the foam. Examples are OH-functional compounds such as (poly)alkylene glycols, preferably monoethylene glycol (MEG or EG), diethylene glycol (DEG), triethylene glycol (TEG), 1-2-propylene glycol (PG), dipropylene glycol (DPG), trimethylene glycol (1,3-propanediol PDO), tetramethylene glycol (butanediol BDO), butyldiglycol (BDG), neopentylglycol, 2-methyl-1,3-propanediol (Ortegol® CXT) and higher homologues thereof such as, for example, polyethylene glycol (PEG) having average molecular masses between 200 and 3000. Particularly preferred OH-functional compounds further include polyethers having average molecular masses of 200 to 4500, in particular 400 to 2000, among these preferably water-, allyl-, butyl- or nonyl-started polyethers, in particular those which are based on propylene oxide (PO) and/or ethylene oxide (EO) blocks.

When nitrogenous compounds of formulae (I), (II), (III), (IV), (V), (VI) and/or (VII) according to the present invention or premixed catalyst combinations of compounds according to the present invention with additional catalysts, as defined above, are dissolved or used in combination with a solvent, the mass ratio of catalyst or catalyst combination to solvent is preferably in the range from 100:1 to 1:4, preferably from 50:1 to 1:3 and more preferably from 25:1 to 1:2.

Useful added-substance materials include any prior art substances used in the manufacture of polyurethanes, in particular in the manufacture of foamed polyurethane materials, for example blowing agents, preferably water to form $CO_2$ and, if necessary, further physical blowing agents, crosslinkers and chain extenders, stabilizers against oxidative degradation (so-called antioxidants), flame retardants, surfactants, biocides, cell-refining additives, cell openers, solid fillers, antistats, nucleators, thickeners, dyes, pigments, colour pastes, scents, emulsifiers, buffers and/or additional catalytically active substances, in particular as defined above.

When the polyurethane systems to be produced are polyurethane foams, it may be advantageous to use water as blowing agent. The amount of water used is preferably from 0.10 to 25.0 pphp (pphp=parts by weight per 100 parts by weight of polyol).

Suitable physical blowing agents are also usable. These are, for example, liquefied $CO_2$, and volatile liquids, for example hydrocarbons of 3, 4 or 5 carbon atoms, preferably cyclo-, iso- and n-pentane, hydrofluorocarbons, preferably HFC 245fa, HFC 134a and HFC 365mfc, hydrochlorofluorocarbons, preferably HCFC 141b, hydrofluoroolefins (HFO) or hydrohaloolefins, such as, e.g., 1234ze, 1233zd(E) or 1336mzz, oxygen-containing compounds such as methyl formate, acetone and dimethoxymethane, or hydrochlorocarbons, preferably dichloromethane and 1,2-dichloroethane.

In addition to water and any physical blowing agents, it is also possible to use other chemical blowing agents which react with isocyanates to evolve a gas, an example being formic acid.

Crosslinkers and chain extenders include low molecular weight isocyanate-reactive polyfunctional compounds. Suitable examples are hydroxyl- or amine-terminated substances such as glycerol, neopentylglycol, 2-methyl-1,3-propanediol, triethanolamine (TEOA), diethanolamine (DEOA) and trimethylolpropane. Usage concentration is typically between 0.1 and 5 parts, based on 100 parts of polyol, but may also differ therefrom, depending on the formulation. Crude MDI used in mold foaming likewise performs a crosslinking function. The level of low molecular weight crosslinkers is accordingly reducible in proportion to the increasing amount of crude MDI.

Suitable stabilizers against oxidative degradation, known as antioxidants, preferably include all common free-radical scavengers, peroxide scavengers, UV absorbers, light stabilizers, complexing agents for metal ion impurities (metal deactivators). It is preferable to use compounds of the following classes of substances and/or substance classes comprising the following functional groups, wherein substituents on the respective core structures are particularly preferably those that have isocyanate-reactive groups; 2-(2'-hydroxyphenyl)benzotriazoles, 2-hydroxybenzophenones, benzoic acids and benzoates, phenols, in particular comprising tert-butyl and/or methyl substituents on the aromatic entity, benzofuranones, diarylamines, triazines, 2,2,6,6-tetramethylpiperidines, hydroxylamines, alkyl and aryl phosphites, sulphides, zinc carboxylates, diketones. Useful phenols include, for example, esters based on 3-(4-hydroxyphenyl)propionic acid such as triethylene glycol bis[3-(3-tert-butyl-4-hydroxy-5-methylphenyl)propionate], octadecyl 3-(3,5-di-tert-butyl-4-hydroxyphenyl)propionate, or methylenediphenols such as 4,4'-butylidenebis(6-tert-butyl-3-methylphenol). Examples of preferred 2-(2'-hydroxyphenyl)benzotriazoles are 2-(2'-hydroxy-5'-methylphenyl) benzotriazole and 2-(2'-hydroxy-3',5'-di-tert-butylphenyl). Examples of preferred 2-hydroxybenzophenones are 2-hydroxy-4-n-octoxybenzophenone, 2,2',4,4'-tetrahydroxybenzophenone and 2,4-dihydroxybenzophenone. Preferred examples of benzoates are hexadecyl 3,5-di-tert-butyl-4-hydroxybenzoate and tannins.

Suitable flame retardants for the purposes of this invention are any substances considered suitable therefor in the prior art. Examples of preferred flame retardants are liquid organophosphorus compounds such as halogen-free organophosphates, e.g. triethyl phosphate (TEP), halogenated phosphates, e.g. tris(1-chloro-2-propyl) phosphate (TCPP) and tris(2-chloroethyl) phosphate (TCEP), and organic phosphonates, e.g. dimethyl methanephosphonate (DMMP), dimethyl propanephosphonate (DMPP), or solids such as ammonium polyphosphate (APP) and red phosphorus. Suitable flame retardants further include halogenated compounds, for example halogenated polyols, and also solids such as expandable graphite and melamine.

Surfactants, which are used in particular in the manufacture of foamed polyurethane materials, are selectable for example from the group comprising anionic surfactants, cationic surfactants, nonionic surfactants and/or amphoteric surfactants. Useful surfactants for the purposes of the present invention also include polymeric emulsifiers such as polyalkyl polyoxyalkyl polyacrylates, polyvinylpyrrolidones and polyvinyl acetates.

Useful biocides include, for example, commercially available products, such as chlorophene, benzisothiazoline, hexahydro-1,3,5-tris(hydroxyethyl-s-triazine), chloromethylisothiazoline, methylisothiazoline or 1,6-dihydroxy-2,5-dioxohexane, which are known by the trade names of BIT 10, Nipacide BCP, Acticide MBS, Nipacide BK, Nipacide CI, Nipacide FC.

The foaming properties of polyurethane foams can be influenced by producing them using in particular siloxanes and/or organomodified siloxanes, in which case the substances mentioned in the prior art can be used. It is preferable to use those compounds which are particularly suitable for the particular types of foam (rigid foams, hot-cure flexible foams, viscoelastic foams, ester-type foams, cold-cure flexible foams (HR foams), semi-rigid foams). Suitable (organomodified) siloxanes are described for example in the following references: EP 0839852, EP 1544235, DE 102004001408, EP 0839852, WO 2005/118668, US 20070072951, DE 2533074, EP 1537159, EP 533202, U.S. Pat. No. 3,933,695, EP 0780414, DE 4239054, DE 4229402, EP 867465. These compounds are obtainable as described in the prior art. Suitable examples are described for instance in U.S. Pat. No. 4,147,847, EP 0493836 and U.S. Pat. No. 4,855,379.

Useful (foam) stabilizers include any stabilizers known from the prior art. Preference is given to using foam stabilizers based on polydialkylsiloxane-polyoxyalkylene copolymers of the type generally/commonly used in the manufacture of foamed urethane materials. The construction of these compounds is preferably such that, for example, a polydimethylsiloxane moiety attaches to a long-chain copolymer formed from ethylene oxide and propylene oxide. The link between the polydialkylsiloxane and the polyether portion may be via an SiC link or an Si—O—C bond. In structural terms, the polyether or the different polyethers may attach to the polydialkylsiloxane terminally or laterally. The alkyl moiety or the various alkyl moieties therein may be aliphatic, cycloaliphatic or aromatic. Methyl groups are very particularly advantageous therein. The polydialkylsiloxane may be linear or else contain branching. Suitable stabilizers, in particular foam stabilizers, are described inter alia in U.S. Pat. Nos. 2,834,748, 2,917,480 and also in U.S. Pat. No. 3,629,308. Suitable stabilizers are available from Evonik Industries AG under the trade name TEGOSTAB®.

Suitable siloxanes for use when the nitrogenous compounds of formulae (I), (II), (III), (IV), (V), (VI) and/or (VII) and/or the corresponding quaternized and/or protonated compounds are used according to the present invention in the manufacture of foamed polyurethane materials have in particular the following structure:

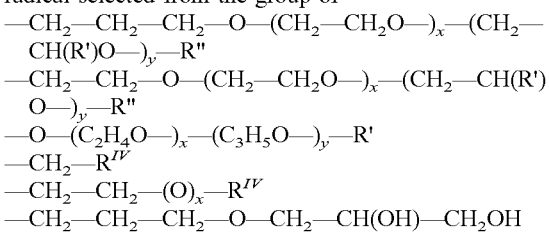

(VIII)

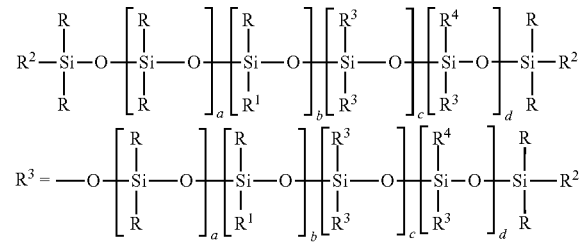

in which
a is independently 0 to 500, preferably 1 to 300 and especially 2 to 150,
b is independently 0 to 60, preferably 1 to 50 and especially 1 to 30,
c is independently 0 to 10, preferably 0 or >0 to 5,
d is independently 0 to 10, preferably 0 or >0 to 5,
with the proviso that, for each molecule of the formula (VIII), the mean number $\Sigma d$ of T units $[SiR^3R^4O]$ and the mean number $\Sigma c$ of Q units $[SiR^3R^3O]$ per molecule is not greater than 50 in either case, the mean number $\Sigma a$ of D units [SiRRO] per molecule is not greater than 2000 and the mean number $\Sigma b$ of the siloxy units bearing $R^1$ per molecule is not greater than 100,
R is independently at least one radical from the group of linear, cyclic or branched, aliphatic or aromatic, saturated or unsaturated hydrocarbyl radicals having 1 up to 20 carbon atoms, but is preferably a methyl radical, $R^2$ is independently $R^1$ or R,
$R^1$ is different from R and is independently an organic radical and/or a polyether radical, $R^1$ preferably being a radical selected from the group of
—$CH_2$—$CH_2$—$CH_2$—O—($CH_2$—$CH_2$O—$)_x$—($CH_2$—CH(R')O—$)_y$—R"
—$CH_2$—$CH_2$—O—($CH_2$—$CH_2$O—$)_x$—($CH_2$—CH(R')O—$)_y$—R"
—O—($C_2H_4$O—$)_x$—($C_3H_5$O—$)_y$—R'
—$CH_2$—$R^{IV}$
—$CH_2$—$CH_2$—(O)$_x$—$R^{IV}$
—$CH_2$—$CH_2$—$CH_2$—O—$CH_2$—CH(OH)—$CH_2$OH

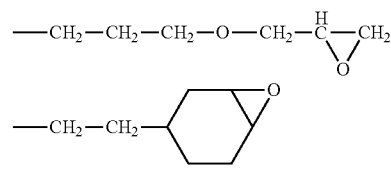

or
—$CH_2$—$CH_2$—$CH_2$—O—$CH_2$—C($CH_2$OH$)_2$—$CH_2$—$CH_3$,
where
x is 0 to 100, preferably >0, especially 1 to 50,
x' is 0 or 1,
y is 0 to 100, preferably >0, especially 1 to 50,
z is 0 to 100, preferably >0, especially 1 to 10,
R' is independently an optionally substituted alkyl or aryl group having 1 to 12 carbon atoms, substituted, for example, by alkyl radicals, aryl radicals or haloalkyl or haloaryl radicals, where different R' substituents may be present within any $R^1$ radical and/or any molecule of formula (VIII), and
R" is independently a hydrogen radical or an alkyl group having 1 to 4 carbon atoms, a-C(O)—R''' group with R'''=alkyl radical, a —$CH_2$—O—R' group, an alkylaryl group, for example a benzyl group, the —C(O)NH—R' group,
$R^{IV}$ is a linear, cyclic or branched hydrocarbyl radical which also has further substitution, for example substitution by halogens, and has 1 to 50, preferably 9 to 45, more preferably 13 to 37, carbon atoms,
$R^4$ may independently be R, $R^1$ and/or a functionalized organic, saturated or unsaturated radical having substitution by heteroatoms, selected from the group of the alkyl, aryl, chloroalkyl, chloroaryl, fluoroalkyl, cyanoalkyl, acryloyloxyaryl, acryloyloxyalkyl, methacryloyloxyalkyl, methacryloyloxypropyl and vinyl radical,
with the proviso that at least one substituent from $R^1$, $R^2$ and $R^4$ is not R. The various monomer units in the structural units specified in the formulae (siloxane chains and/or polyoxyalkylene chain) may take the form of alternating blocks with any number of blocks in any sequence or be subject to a random distribution. The indices used in the formulae should be regarded as statistical averages.

The siloxanes of formula (VIII) are obtainable by the familiar methods, for example the noble metal-catalysed hydrosilylation reaction of compounds having a double bond with appropriate hydrogensiloxanes as described for example in EP 1520870. The cited document EP 1520870 is hereby incorporated herein as reference and shall be deemed part of the disclosure of the present invention.

Compounds used as having at least one double bond per molecule include, for example, □-olefins, vinylpolyoxyalkylenes and/or allylpolyoxyalkylenes. It is preferable to use vinylpolyoxyalkylenes and/or allylpolyoxyalkylenes. Particularly preferred vinylpolyoxyalkylenes include, for example, vinylpolyoxyalkylenes having a molecular weight in the range from 100 g/mol to 8000 g/mol, which may be constructed from the monomers propylene oxide, ethylene oxide, butylene oxide and/or styrene oxide in blockwise or random distribution and which may be not only hydroxyl-functional but also endcapped by a methyl ether function or an acetoxy function. Particularly preferred allylpolyoxy-alkylenes include, for example, allylpolyoxyalkylenes having a molecular weight in the range from 100 g/mol to 5000 g/mol, which may be constructed from the monomers propylene oxide, ethylene oxide, butylene oxide and/or styrene oxide in blockwise or random distribution and which may be not only hydroxyl-functional but also endcapped by a methyl ether function or an acetoxy function. Particular preference for use as compounds having at least one double bond per molecule is given to the exemplified α-olefins, allyl alcohol, 1-hexenol, vinylpolyoxyalkylenes and/or allylpolyoxyalkylenes and also allyl glycidyl ether and vinyl-cyclohexene oxide.

Preference in the context of the present invention (in particular in the context of the use according to the present invention) is given to the use of siloxanes of formula (VIII) where a is separately in each occurrence from 1 to 300, b is separately in each occurrence from 1 to 50, c is separately in each occurrence from 0 to 4, d is separately in each occurrence from 0 to 4, with the proviso that, per molecule of formula (VIII), the average number Σd of T-units and the average number Σc of Q-units per molecule is each not greater than 20, the average number Σa of D-units per molecule is not greater than 1500 and the average number Σb of $R^1$-bearing siloxy units per molecule is not greater than 50.

One particularly preferred embodiment of the present invention (in particular in the context of the use according to the present invention) utilizes siloxanes of formula (VIII) where $R^1$ is separately in each occurrence an organic moiety
—$CH_2$—$CH_2$—$CH_2$—O—($CH_2$—$CH_2$O—)$_x$—($CH_2$—CH(R)O—)$_y$—R"
—$CH_2$—$CH_2$—O—($CH_2$—$CH_2$O—)$_x$—($CH_2$—CH(R)O—)$_y$—R"
—$CH_2$—$R^{IV}$
where x is from 0 to 100, preferably >0, in particular from 1 to 50, and y is from 0 to 100, preferably >0, in particular from 1 to 50, and R' in each occurrence is separately the same or different and represents methyl, ethyl and/or phenyl moieties. R" is separately in each occurrence a hydrogen moiety or an alkyl group of 1 to 4 carbon atoms, a —C(O)—R'" group where R'"=alkyl, a —$CH_2$—O—R' group, an alkylaryl group, e.g. a benzyl group, a —C(O)NH—R' group, $R^{IV}$ is a linear, cyclic or branched hydrocarbyl moiety of 1 to 50, preferably 9 to 45, preferably 13 to 37 carbon atoms which is optionally substituted, for example with halogens.

A further preferred embodiment of the present invention (in particular in the context of the use according to the present invention), preferably for production of rigid foams, utilizes siloxanes of formula (VIII) where $R^1$ is separately in each occurrence an organic moiety selected from the group comprising —$CH_2$—$CH_2$—$CH_2$—O—($CH_2$—$CH_2$O—)$_x$—($CH_2$—CH(R)O—)$_y$—R" and/or
—$CH_2$—$CH_2$—O—($CH_2$—$CH_2$O—)$_x$—($CH_2$—CH(R)O—)$_y$—R" and/or
—$CH_2$—$R^{IV}$ where x is from 0 to 100, preferably >0, in particular from 1 to 50, y is from 0 to 100, preferably >0, in particular from 1 to 50, R' is methyl and R" is separately in each occurrence a hydrogen moiety or an alkyl group of 1 to 4 carbon atoms, a C(O)—R'" group where R'"=alkyl, a —CH2-O—R' group, an alkylaryl group, e.g. a benzyl group, a C(O)NH—R' group, wherein the molar fraction of oxyethylene units comprises at least 70% of the oxyalkylene units, based on the combined amount of oxyalkylene units, i.e. x/(x+y) is >0.7. When this set of requirements applies, the polyoxyalkylene chain preferably also bears a hydrogen at the end. When these requirements apply, it is a further preferred embodiment of the invention (in particular in the context of the use according to the invention) to use siloxanes of formula (VIII) wherein the oxyalkylene units present in $R^1$ are exclusively oxyethylene units and R" is other than hydrogen.

A further preferred embodiment of the present invention (in particular in the context of the use according to the present invention), preferably for production of flexible slabstock foams, utilizes siloxanes of formula (VIII) where R1 is separately in each occurrence an organic moiety selected from the group comprising —$CH_2$—$CH_2$—$CH_2$—O—($CH_2$—$CH_2$O—)$_x$—($CH_2$—CH(R)O—)$_y$—R" and/or
—$CH_2$—$CH_2$—O—($CH_2$—$CH_2$O—)$_x$—($CH_2$—CH(R)O—)$_y$—R" and/or
—$CH_2$—$R^{IV}$ where x is from 0 to 100, preferably >0, in particular from 1 to 50, y is from 0 to 100, preferably >0, in particular from 1 to 50, R' is methyl and R" is separately in each occurrence a hydrogen moiety or an alkyl group of 1 to 4 carbon atoms, a C(O)—R'" group where R'"=alkyl, a —CH2-O—R' group, an alkylaryl group, e.g. a benzyl group, a C(O)NH—R' group, wherein the molar fraction of oxyethylene units comprises at most 60% of the oxyalkylene units, based on the combined amount of oxyalkylene units, i.e. x/(x+y) is <0.6.

A further preferred embodiment of the present invention (in particular in the context of the use according to the present invention) uses siloxanes of formula (VIII) wherein inter alia olefins are used in the hydrosilylation, as a result of which $R^1$ consists to an extent of not less than 10 mol %, preferably to an extent of not less than 20 mol % and more preferably to an extent of not less than 40 mol % of $CH_2$—$R^{IV}$, where $R^{IV}$ is a linear or branched hydrocarbon of 9 to 17 carbon atoms.

A further preferred embodiment of the present invention (in particular in the context of the use according to the present invention) uses siloxanes of formula (VIII) wherein the terminal positions (also called the alpha and omega positions) on the siloxane are at least partly functionalized with $R^1$ moieties. In fact, at least 10 mol %, preferably at least 30 mol % and more preferably at least 50 mol % of the terminal positions are functionalized with $R^1$ moieties.

One particularly preferred embodiment of the invention (in particular in the context of the use according to the invention) uses siloxanes of formula (VIII) wherein, on statistical average, not more than 50%, preferably not more than 45% and more preferably not more than 40% of the entire average molecular weight of the siloxane is accounted for by the summed molar mass of all, possibly different, $R^1$ moieties in the siloxane.

A further preferred embodiment of the present invention (in particular in the context of the use according to the present invention) uses siloxanes of formula (VIII) wherein R is methyl and the number of structural elements indexed a is greater than the number of structural elements indexed b such that the a/b ratio is not less than seven, preferably above 10 and more preferably above 12.

A further preferred embodiment of the present invention (in particular in the context of the use according to the present invention) uses siloxanes of formula (VIII) where the oxyalkylene units present in $R^1$ are exclusively oxyethylene units and the R" moiety is other than hydrogen.

The siloxanes are also usable in the context of the present invention (in particular in the context of the use according to the present invention) as a part of compositions comprising various vehicular media. Useful vehicular media include, for example, glycols, for example monoethylene glycol (MEG), diethylene glycol (DEG), propylene glycol (PG) or dipropylene glycol (DPG), alkoxylates or oils of synthetic and/or natural origin.

The composition for production of polyurethane systems, preferably for production of foamed polyurethane materials, is preferably admixed with sufficient siloxane of formula (VIII) that the mass fraction of the final polyurethane system, preferably the polyurethane foam, which is attributable to siloxanes of formula (VIII), in the range from 0.01 to 10 wt %, preferably from 0.1 to 3 wt %.

The nitrogenous compounds of formulae (I), (II), (III), (IV), (V), (VI) and/or (VII) according to the present invention and corresponding quaternized and/or protonated compounds are preferably used in the manufacture of polyurethane systems, in particular polyurethane foams.

It may be advantageous for the production of the polyurethane system to comprise preparing and/or utilizing a composition comprising at least one nitrogenous compound of formulae (I), (II), (III), (IV), (V), (VI) and/or (VII) according to the present invention, as defined above, and/or a corresponding quaternized and/or protonated compound, at least one polyol component, optionally at least one isocyanate component and also optionally one or more blowing agents, and reacting this composition. Particular preference is given to utilizing such compositions comprising the polyurethane production, in particular polyurethane foam production, chemistries/components described above in relation to the use.

A further aspect of the invention resides in using the above-described nitrogenous compound of formulae (I), (II), (III), (IV), (V), (VI) and/or (VII), and/or a corresponding quaternized and/or protonated compound for production of low-emission polyurethanes, in particular for production of low-emission polyurethane foams, viz. advantageously low-emission with regard to emissions of nitrogenous compounds, previously also called amine emissions, advantageously low-emission with regard to emissions of dimethylformamide (DMF), and/or advantageously low-emission with regard to aldehyde emissions, in particular formaldehyde emissions. As far as the term "low-emission" is concerned, the preceding description and its elucidations, in particular test methods, are referenced. As far as preferred incarnations of this aspect are concerned, reference is likewise made to the preceding description, in particular to the preferred embodiments recited therein.

A further aspect of the invention resides in using the above-described nitrogenous compound of formulae (I), (II), (III), (IV), (V), (VI) and/or (VII) and/or a corresponding quaternized and/or protonated compound for production of low-odour polyurethanes, preferably for production of low-odour polyurethane foams, in particular for production of low-odour flexible polyurethane foams. As far as the term "low-odour" is concerned, the preceding description and its elucidations are referenced. As far as preferred incarnations of this aspect are concerned, reference is likewise made to the preceding description, in particular to the preferred embodiments recited therein.

A further aspect of the invention resides in using the above-described nitrogenous compound of formulae (I), (II), (III), (IV), (V), (VI) and/or (VII) and/or a corresponding quaternized and/or protonated compound for production of ageing-resistant polyurethane systems, in particular foamed polyurethane materials. As far as the term "ageing-resistant" is concerned, the preceding description and its elucidations and test methods are referenced. As far as preferred incarnations of this aspect are concerned, reference is likewise made to the preceding description, in particular to the preferred embodiments recited therein.

A further aspect of the invention resides in using the above-described nitrogenous compound of formulae (I), (II), (III), (IV), (V), (VI) and/or (VII) and/or a corresponding quaternized and/or protonated compound for production of discoloration-minimized polyurethane systems, in particular for production of foamed polyurethane materials, preferably for production of polyurethanes for application in the automotive industry, in particular in automotive interiors, for example as roof liners, interior door trim, die-cut sun visors, steering wheels and/or seating systems. Discoloration-minimized is to be understood as meaning that the polyurethane systems provided by use of nitrogenous catalysts according to the present invention lead in particular to lower discolorations of plastics, in particular plastics covers, in automotive interiors than such polyurethane systems obtainable using conventional catalysts according to the prior art, in particular using amines that are not in accordance with the present invention, as can be shown for example by means of a PVC discoloration test. Again, the preceding description and its explanations and test methods are referenced. As far as preferred incarnations of this aspect are concerned, reference is likewise made to the preceding description, in particular to the preferred embodiments recited therein.

A further aspect of the invention resides in using the above-described nitrogenous compound of formulae (I), (II), (III), (IV), (V), (VI) and/or (VII) and/or a corresponding quaternized and/or protonated compound for production of polyurethane systems having a wide level of processing latitude, in particular for production of semi-rigid polyurethane foams (open-cell rigid foams, in particular for application as roof liners in automotive interiors). "Wide level of processing latitude" is to be understood as meaning that, advantageously, larger variability in the use concentration of nitrogenous compounds according to the present invention is possible without adverse effect on the desired material-related properties, for example the open-cell content of the foam or the density distribution across the foam slab, versus comparable prior art amine catalysts or prior art amine catalysts typically used for such applications. Again, the preceding description and its explanations and test methods are referenced. As far as preferred incarnations of this aspect are concerned, reference is likewise made to the preceding description, in particular to the preferred embodiments recited therein.

A further aspect of the invention is a composition comprising at least one polyol component, wherein the composition includes at least one nitrogenous compound of formulae (I), (II), (III), (IV), (V), (VI) and/or (VII), as defined and described above, and/or the corresponding quaternized and/or protonated compounds, wherein the composition preferably comprises at least one isocyanate component, and wherein the nitrogenous compound of formulae (I), (II), (III), (IV), (V), (VI) and/or (VII) is preferably present in the form of a technical-grade product mixture as described above, and wherein the composition preferably comprises additional amine catalysts not conforming to formulae (I), (II), (III), (IV), (V), (VI) and/or (VII).

The molar ratio of the combined amount of nitrogenous catalysts, comprising the nitrogenous compounds of formulae (I), (II), (III), (IV), (V), (VI) and/or (VII), to the combined amount of isocyanate-reactive groups of the polyol component is preferably in the range from $4\times10^{-4}$:1 to 0.2:1.

Preferably, the nitrogenous compounds of formulae (I), (II), (III), (IV), (V), (VI) and/or (VII), corresponding quaternized and/or protonated compounds, are used in a mass fraction of 0.01 to 20.0 parts (pphp), preferably 0.01 to 5.00 parts and more preferably 0.02 to 3.00 parts based on 100 parts (pphp) of polyol component.

The composition of the present invention may further comprise one or more blowing agents as described above. In addition to or in lieu of blowing agents, the composition of the present invention may comprise further added-substance materials/auxiliaries or additives that are used in the manufacture of polyurethane systems, preferably polyurethane foams. A selection of suitable auxiliaries/added-substance materials/additives, e.g. foam stabilizers or flame retardants, was described above in relation to the production of the polyurethane systems, in particular in relation to the production of the foamed polyurethane materials.

Processing the compositions of the present invention into polyurethane systems, in particular foamed polyurethane materials, is performable according to any method known to a person skilled in the art, for example by manual mixing or preferably by means of foaming machines, in particular low-pressure or high-pressure foaming machines. Batch processes may be used here, for example in the manufacture of molded foams, refrigerators, automotive seats and panels, or continuous processes, for example in the case of insulation boards, metal composite elements, slabstock foams or in the case of spraying processes.

Any conventional methods of producing foamed polyurethane materials are usable. For instance, the foaming process may proceed not only horizontally but also vertically, in batch or continuous equipment. The compositions employed according to the present invention are similarly useful for $CO_2$ technology. Use in low-pressure and high-pressure machines is possible, with the compositions being dosable directly into the mixing chamber or else being admixed upstream of the mixing chamber, to one of the components subsequently arriving in the mixing chamber. Admixture in the raw-material tank is also possible.

Usage of nitrogenous compounds of formulae (I), (II), (III), (IV), (V), (VI) and/or (VII) and/or of the corresponding quaternized and/or protonated compounds in the manner of the present invention makes the hereinbelow described polyurethane systems of the present invention obtainable.

A further aspect of the present invention is a composition suitable for use in the manufacture of polyurethanes, in particular in the manufacture of foamed polyurethane materials, said composition containing (a) at least one nitrogenous compound of formulae (I), (II), (III), (IV), (V), (VI) and/or (VII), preferably at least one compound of formulae (III), (IV), (V) and/or (VI), advantageously in a combined amount of ≥5 wt %, preferably 20-95 wt %, in particular 30-70 wt %, (b) optionally 1-(2-hydroxyethyl)pyrrolidine, advantageously in an amount ≥5 wt %, preferably 20-95 wt %, in particular 30-70 wt %, (c) optionally 1-(2-aminoethyl)pyrrolidine, advantageously in an amount ≥5 wt %, preferably 20-95 wt %, in particular 30-70 wt %, (d) optionally 2-(2-(pyrrolidin-1-yl)ethoxy)ethanol, advantageously in an amount ≥5 wt %, in particular 20-95 wt %, preferably 30-70 wt %, (e) optionally 2-((2-(pyrrolidin-1-yl)ethyl)amino)ethanol, 2-((3-(pyrrolidin-1-yl)propyl)amino)ethanol, 2,2'-((3-(pyrrolidin-1-yl)propyl)azanediyl)diethanol, 2,2'-((2-(pyrrolidin-1-yl)ethyl)azanediyl)diethanol, advantageously in an amount ≤95 wt %, in particular 20-90 wt %, preferably 30-80 wt %, (f) optionally ethylenediamine (EDA), advantageously in an amount ≤95 wt %, in particular 20-90 wt %, preferably 30-80 wt %, (g) optionally diethylenetriamine (DETA), advantageously in an amount ≤95 wt %, in particular 20-90 wt %, preferably 30-80 wt %, (h) optionally tris(2-aminoethyl)amine (tren), advantageously in an amount ≤95 wt %, in particular 20-90 wt %, preferably 30-80 wt %, (i) optionally monoethanolamine (MEA), advantageously in an amount ≤95 wt %, in particular 20-90 wt %, preferably 30-80 wt %, (j) optionally diethanolamine (DEOA), advantageously in an amount ≤95 wt %, in particular 20-90 wt %, preferably 30-80 wt %, (k) optionally triethanolamine, advantageously in an amount ≤95 wt %, in particular 20-90 wt %, preferably 30-80 wt %, (l) optionally 1,4-butanediol, advantageously in an amount ≤95 wt %, in particular 20-90 wt %, preferably 30-80 wt %, (m) optionally monoethylene glycol (MEG), advantageously in an amount ≤95 wt %, in particular 20-90 wt %, preferably 30-80 wt %, (n) optionally diethylene glycol (DEG), advantageously in an amount ≤95 wt %, in particular 20-90 wt %, preferably 30-80 wt %, and/or (o) optionally 1,2-propylene glycol (PG), dipropylene glycol (DPG), trimethylene glycol, butyldiglycol, neopentylglycol, 2-methyl-1,3-propanediol, N,N-dimethylcyclohexylamine, N,N-dimethylaminopropylamine, 1-(3-aminopropyl)pyorrolidine, triethylenediamine, 2,2,4-trimethyl-2-silamorpholine, N-ethyl-2,2-dimethyl-2-silamorpholine, N-(2-aminoethyl)-morpholine, N-(2-hydroxyethyl)morpholine, N,N-dimethylaminoethanol, N,N-diethylaminoethanol, bis(2-dimethylaminoethyl ether), 1-(3-hydroxypropyl)pyrrolidine, N,N-dimethylaminoethoxyethanol, N,N,N'-trimethyl-N'-(2-hydroxyethyl)bis(2-aminoethyl) ether, tris-(dimethylaminopropyl)hexahydro-1,3,5-triazine, 1,8-diazabicyclo[5.4.0]undec-7-ene, 1,5-diazabicyclo[4.3.0]non-5-ene, 1,5,7-triazabicyclo[4.4.0]dec-5-ene, N-methyl-1,5,7-triazabicyclo[4.4.0]dec-5-ene, 1,4,6-triazabicyclo[3.3.0]oct-4-ene, 1,1,3,3-tetramethylguanidine and/or 2,4,6-tris(dimethylaminomethyl)phenol, advantageously in a combined amount ≤95 wt %, in particular 20-90 wt %, preferably 30-80 wt %.

Compositions which are particularly preferred for the purposes of the aforementioned aspect of the present invention are those compositions using at least one nitrogenous compound of formulae (I), (II), (III), (IV), (V), (VI) and/or (VII) and/or a corresponding quaternized and/or protonated compound in combination with a), with b), with c), with d), with e), with f), with g), with h), with i), with j), with k), with l), with m), with n), with o), with b and m), with c) and m), with d) and m), with e) and m), with b) and n), with c) and n), with d) and n), with e) and n), with b) and c), with b) and d), with b), c) and d), with b), c) and m), with b), d), and m), with b), c), d), and m), with b), c) and n), with b), d), and n) or in combination with b), c), d), and n).

A further aspect of the present invention is accordingly a polyurethane system that is obtainable by a use as described above.

These polyurethane systems of the present invention are preferably polyurethane foams, more preferably rigid polyurethane foams, flexible polyurethane foams, viscoelastic foams, high-resilience (HR) foams, semi-rigid polyurethane foams, thermoformable polyurethane foams or integral foams. The term polyurethane herein is to be understood as a generic term for any polymer obtained from di- or polyisocyanates and polyols or other isocyanate-reactive species, such as amines for example, in that the urethane bond need not be the only or predominant type of bond. Polyisocyanurates and polyureas are also expressly included.

The polyurethane system, in particular polyurethane foam, of the present invention is preferably a rigid polyurethane foam, a flexible polyurethane foam, a viscoelastic foam, a high-resilience (HR) foam, a semi-rigid polyurethane foam, a thermoformable polyurethane foam or an integral foam, preferably comprising a 0.005 to 10 wt %, more preferably 0.05 to 3 wt % and yet more preferably 0.1 to 1 wt % mass fraction of nitrogenous compounds of formulae (I), (II), (III), (IV), (V), (VI) and/or (VII), and/or of corresponding quaternized and/or protonated compounds and/or of moieties in the final polyurethane foam which are obtained by their conversion.

In one preferred embodiment, the foamed polyurethane materials according to and/or obtained according to the present invention are open-cell polyurethane foams, in particular flexible foams, more preferably hot-cure flexible foams. Open-cell is to be understood in the context of the present invention as meaning that the air permeability (=porosity) of the foam in question is good. The air permeability of a foam is determinable by performing a dynamic-pressure measurement on the foam. The dynamic-pressure measurement may be carried out in accordance with EN 29053. When the measured dynamic pressure is reported in mm of water column, open-cell polyurethane foams, in particular flexible polyurethane foams, have a dynamic pressure of below 100 mm, preferably ≤50 mm of water column, as determined by the method of measurement described in the examples.

A preferred composition for producing polyurethane/polyisocyanurate foam within the meaning of the present invention has a foam density of preferably 5 to 800, in particular 5 to 300, more preferably 5 to 150, and still more preferably 10 to 90 kg/m³, and has in particular the following composition:

| component | weight fraction |
| --- | --- |
| polyol | 100 |
| (amine) catalyst | 0.05 to 5 |
| tin catalyst | 0 to 5, preferably 0.001 to 2 |
| potassium trimerization catalyst | 0 to 10 |
| siloxane | 0.1 to 15, preferably 0.2 to 7 |
| water | 0 to <25, preferably 0.1 to 15 |
| blowing agent | 0 to 130 |
| flame retardant | 0 to 70 |
| fillers | 0 to 150 |
| further additives | 0 to 20 |
| isocyanate index: | above 15 |

The invention further provides the use of polyurethane systems, in particular polyurethane foams, as described above, as refrigerator insulation, insulation panel, sandwich element, pipe insulation, spray foam, 1- and 1.5-component can foam, wood imitation, modelling foam, floral foam, packaging foam, mattress, furniture cushioning, furniture molding foam, pillows, rebonded foam, sponge foam, automotive seat cushioning, headrest, dashboard, automotive interior, automotive roof liner, sound absorption material, steering wheel, shoe sole, carpet backing foam, filter foam, sealant, sealant foam and adhesive or for producing corresponding products.

The present invention is described in exemplary fashion in the examples recited below, without the invention, the scope of application of which results from the whole of the description and the claims, being limited to the embodiments mentioned in the examples.

EXAMPLES

Preparing Inventive Nitrogenous Compounds

Synthesis Example 1: Preparing the Compound of Formula (III)

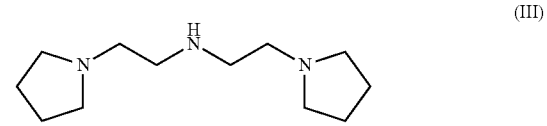 [SMILES: C1CCN(CCNCCN2CCCC2)C1]

(III)

| Chemicals | CAS | Supplier |
| --- | --- | --- |
| Bis(2-chloroethyl)amine hydrochloride, 98% | 821-48-7 | Sigma-Aldrich Chemie GmbH |
| Pyrrolidine, >99% | 123-75-1 | Sigma-Aldrich Chemie GmbH |
| Diethyl ether | 60-29-7 | Sigma-Aldrich Chemie GmbH |

In a 6 L multi-neck flask fitted with reflux condenser, KPG stirrer, temperature sensor with inert gas feed line and a dropping funnel 2920 ml (35.3 mol, 7 equiv.) of pyrrolidine were initially charged and heated to reflux under vigorous agitation. 900 g (5.04 mol, 1 equiv.) of bis(β-chloroethyl) amine hydrochloride dissolved in 2.2 L of water were then added dropwise via the dropping funnel in the course of four hours such that a reaction temperature of 100° C. was not exceeded. Refluxing was continued for a further four hours. Half the reaction batch was allowed to cool down to room temperature and concentrated in a rotary evaporator. The residue was then admixed with 900 ml of an aqueous 10 M NaOH solution to precipitate NaCl. The organic phase was separated, the aqueous phase was extracted with diethyl ether (3×500 ml), and then the organic phases were combined with the ether extracts and desolventized in the rotary evaporator to obtain 731.41 g of a dark brown oil. The crude product was divided into two parts and subjected to a vacuum distillation via a 30 cm Vigreux column. The first distillation gave 223.72 g of the desired product, which passed over at 0.57 mbar and an overhead temperature of 100-105° C. The second half was worked up in the same manner to give 231.5 g of the product at an overhead temperature of 115° C. and 2.9 mbar. The yield across the two distillations was 455.22 g of the desired product according to formula (III) in a purity of ≥95% (GC). Analyses by NMR spectroscopy and also GC/MS coupling confirmed the product.

Synthesis Example 2: Preparing the Compound of Formula (IV)

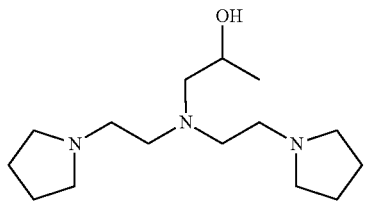

(IV)

| Chemicals Compound of formula (III) | CAS | Supplier |
|---|---|---|
| Propylene oxide, >99% | 75-56-9 | Sigma-Aldrich Chemie GmbH |

A 250 ml laboratory autoclave fitted with a stirring device, a heatable jacket, a pressure transducer and a temperature probe and also an inert gas feed line was cooled with an ice bath while being initially charged with 105.67 g (0.5 mol) of compound (III) prepared in Synthesis Example 1 and 29.04 g (0.5 mol) of propylene oxide. The autoclave was sealed and inertized with nitrogen and the jacket was heated with a thermal oil to 100° C. while a rise in pressure was observed. The reaction temperature was then maintained for 6 hours under agitation. After the reaction time had ended, the system was allowed to cool down to room temperature and the pressure vessel was decompressed and purged with nitrogen. The crude reaction mixture was analysed by gas chromatography and in addition to unconverted reactant was found to contain the desired monopropoxylated product of formula (IV) and also its higher propoxylates and further by-products. A fine distillation was then carried out to isolate the product. In this way, 56.6 g (42% of theory) of the monopropoxylated target product of formula (IV) were obtained in a GC purity of 98.1% in a clear, minimally yellow fraction, slightly oily/viscous at RT, at a pressure of 3.2 mbar and an overhead temperature of 120-125° C. The NMR-spectroscopic as well as the GC or GC/MS analyses confirmed product formation.

Synthesis Example 3: Preparing the Compound of Formula (V)

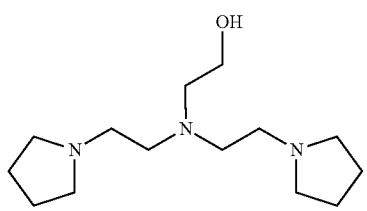

(V)

| Chemicals Compound of formula (III) | | Supplier |
|---|---|---|
| Ethylene oxide, 3M in THF | | Sigma-Aldrich Chemie GmbH |

A 500 ml laboratory autoclave fitted with a stirring device, a heatable jacket, a pressure transducer and temperature probe and also an inert gas feed line was cooled with a dry ice/isopropanol cooling mixture while 166.7 ml of a 3 molar solution of ethylene oxide in THF (corresponds to 0.5 mol of ethylene oxide) were initially charged and a further 105.67 g (0.5 mol) of compound (III) as prepared in Synthesis Example 1 were added. The previously nitrogen-purged autoclave was then heated to 100° C. via the jacket and a thermal oil, and a rise in pressure was observed. The reaction temperature was then maintained for 6 hours under agitation. On completion of the reaction time the pressure vessel was allowed to cool down to room temperature, decompressed and purged with nitrogen. The crude reaction mixture was analysed by gas chromatography and in addition to unconverted reactant was found to contain the desired monoethoxylated product of formula (V) and also its higher ethoxylates and further by-products. A fine distillation was then carried out to isolate the product. In this way, 67.7 g (53% of theory) of the monoethoxylated target product of formula (V) were obtained in a GC purity of 97.7% in a clear, minimally yellow fraction, slightly oily/viscous at RT, at a pressure of 6 mbar and an overhead temperature of 125-128° C. The NMR-spectroscopic as well as the GC or GC/MS analyses confirmed product formation.

Synthesis Example 4: Preparing the Compound of Formula (VI)

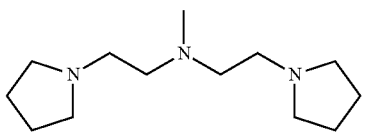

(VI)

| Chemicals Compound of formula (III) | CAS | Supplier |
|---|---|---|
| Formic acid, >95% | 64-18-6 | Sigma-Aldrich Chemie GmbH |
| Formaldehyde, 37% in water | 50-00-0 | Sigma-Aldrich Chemie GmbH |
| Hydrochloric acid, 37% | 7647-01-0 | Sigma-Aldrich Chemie GmbH |
| Sodium hydroxide, p.a. | 1310-73-2 | Sigma-Aldrich Chemie GmbH |
| Diethyl ether, >98% | 60-29-7 | Sigma-Aldrich Chemie GmbH |

In line with the technical teaching of H. T. Clarke, et al., J. Am. Chem. Soc. 55, 4571 (1933), a 500 ml multi-neck flask fitted with a reflux condenser, a KPG stirrer, a temperature sensor with inert gas feed line and a dropping funnel was initially charged with 99 ml of formic acid (corresponds to 120.83 g, 2.5 mol) before 105.68 g (0.5 mol) of the compound according to formula (III) were added with cooling. This was followed by the addition of 88.1 g of formaldehyde solution (corresponds to 80.81 ml, 1.1 mol) by means of the dropping funnel and refluxing of the reaction mixture for 8 hours. After cooling down to room temperature, 49.27 ml (0.5 mol) of hydrochloric acid were added and the reaction mixture was substantially concentrated in a rotary evaporator. The residue was taken up in a little completely ion-free water and mixed with a solution of 25 g (0.625 mol) of sodium hydroxide in 75 g of water. A 25 ml quantity of diethyl ether was added and the organic phase was separated off. The aqueous phase was extracted three times with 25 ml of diethyl ether each time and the combined organic phases were then desolventized in the rotary evaporator. The residue was subjected to a fractional distillation under reduced pressure which, at a pressure of 3 mbar and an overhead temperature of 117-120° C., yielded a fraction of 85.64 g (76% of theory) of the clear, slightly yellow product according to formula (VI). Gas chromatography analysis of this fraction gave a purity of 98.2%, while analysis by NMR spectroscopy confirmed product formation.

Rigid Foam Foaming Examples

Example 1: Production of Rigid Polyurethane Foams, for Example for Use in the Insulation of Refrigerating Appliances The inventive nitrogenous compounds were performance tested in the foam formulation reported in table 1.

TABLE 1

Formulation 1 for rigid foam applications.

| Formulation 1 | Parts by mass (pphp) |
|---|---|
| Polyol 1[1] | 100 parts |
| Water | 2.60 parts |
| Cyclopentane | 13.1 parts |
| Amine | 0.80 or 1.50 parts (see table 2) |
| TEGOSTAB ® B 8460[2] | 1.50 parts |
| Desmodur ® 44V20L[3] | 198.5 parts |

[1]Polyol 1: Sorbitol/glycerol-based polyether polyol with an OH number of 471 mgKOH/g.
[2]Polyether-modified polysiloxane.
[3]Polymeric MDI from Bayer, 200 mPa*s, 31.5% NCO, functionality 2.7.

The foams were produced by hand mixing. The formulations reported in table 1 were used with various nitrogenous catalysts (amines). This was done by weighing polyol 1, conventional or inventive nitrogenous catalyst (amine), water, foam stabilizer and blowing agent into a beaker and mixing with a 6 cm diameter plate stirrer at 1000 rpm for 30 seconds. The blowing agent quantity which had evaporated during mixing was determined by reweighing and replenished. The isocyanate (MDI) was then admixed, the reaction mixture was stirred with the above-described stirrer at 3000 rpm for 5 s and immediately transferred onto a paper-lined box (27 cm×14 cm in base area and 14 cm in height). The following characteristic parameters were determined to evaluate the catalytic properties: cream time, fiber time, full-rise time and tack-free time.

The results from evaluating the catalytic properties of the inventive nitrogenous compounds of formulae (III), (IV), (V) and (VI) are collated in table 2. The following were used as comparative catalysts to represent the prior art: N,N-dimethylcyclohexylamine (DMCHA), dimethylaminoethoxyethanol (DMEE) and pentamethyldiethylenetriamine (PMDETA).

TABLE 2

Results of foaming tests for formulation 1 (table 1).

| Amine | Cream time [s][3] | Fiber time [s][3] | Full-rise time [s][3] | Tack-free time [s][3] |
|---|---|---|---|---|
| DMCHA[1] | 40 | 142 | 301 | 318 |
| DMEE[1] | 33 | 161 | 280 | 316 |
| PMDETA[2] | 16 | 130 | 209 | 231 |
| FORMULA (III)[1] | 57 | 272 | 441 | 532 |
| FORMULA (IV)[1] | 29 | 157 | 255 | 272 |
| FORMULA (V)[1] | 20 | 105 | 201 | 214 |
| FORMULA (VI)[2] | 20 | 128 | 215 | 218 |

[1]1.50 parts of catalyst used.
[2]0.80 part of catalyst used.
[3]time particulars in seconds [s].

As is discernible from table 2, the inventive compounds of formulae (III), (IV), (V) and (VI) display good to very good catalytic activity in rigid foam. The compound of formula (IV) for example is comparable to DMEE as regards catalytic properties. As regards selectivity, however, the compound of formula (IV) according to the invention is more balanced than DMEE and more comparable to DMCHA. It is evident, then, that enhanced gel activity and selectivity is obtainable, as required, by specifically modifying the compound of formula (III), as is shown by the illustrative results achieved with the compounds of formula (IV) and formula (V). To wit, formula (V) shows a further increase in gel activity over formula (IV) and at the same time almost attains the blow activity of PMDETA. The compound of formula (VI) is activitywise in a similar range to PMDETA, one of the most blow-selective catalysts of the prior art. However, the compound of formula (VI) is somewhat more balanced between the blowing and the gelling reactions than PMDETA.

Flexible Foam Performance Tests

Physical Properties of Flexible Polyurethane Foams:
The flexible polyurethane foams produced were evaluated with regard to the following physical properties:
a) Foam settling at the end of the rise period: Settling or conversely post-rise is obtained from the difference in foam height after direct blow-off and after 3 minutes after blow-off of the foam. Foam height here is measured using a needle secured to a centimetre scale, on the peak in the middle of the foam top surface. A negative value here describes the settling of the foam after the blow-off, while a positive value correspondingly describes the post-rise of the foam.
b) Foam height: The final height of the foam is determined by subtracting the settling from or adding the post-rise to the foam height after blow-off. Foam height is reported in centimetres (cm).
c) Foam density (FD): Determined as described in ASTM D 3574-11 under Test A by measuring the core density. Foam density is reported in kg/m³.
d) Porosity: The air permeability of the foam was determined by a dynamic-pressure measurement on the foam. The measured dynamic pressure is reported in mm of water column, with lower dynamic-pressure values characterizing a more open foam. The values were measured in the range from 0 to 300 mm.
The dynamic pressure was measured using an apparatus comprising a nitrogen source, a reducing valve with manometer, a screw-threaded flow regulator, a wash bottle, a flow meter, a T-piece, an applicator nozzle and a scaled glass tube containing water. The applicator nozzle has an edge length of 100×100 mm, a weight of 800 g, a clear width of 5 mm for the outlet hole, a clear width of 20 mm for the lower applicator ring and an outer diameter of 30 mm for the lower applicator ring. The measurement is carried out by using the reducing valve to adjust the ingoing nitrogen pressure to 1 bar and using the screw-threaded flow regulator to adjust the flow rate to 480l/h. The water quantity in the scaled glass tube is adjusted so that no pressure difference arises and can be read off. To perform the actual measurement on the test specimen, having dimensions of 250×250×50 mm, the applicator nozzle is superposed flush with the edges at the corners of the test specimen and also once at the (estimated) centre of the test specimen (on that side in each case which has the largest surface area). The dynamic pressure is read off once a constant dynamic pressure has been achieved. The five measured values obtained are averaged.

e) Compression load deflection CLD 40% to DIN EN ISO 3386. The measured values are reported in kilopascals (kPa).

Measurement of Foam Emissions (VOC and Fog Values) in Line with the VDA 278 Test Protocol as of October 2011:

The method serves to determine emissions from nonmetallic materials used for molded parts in motor vehicles. The emission of volatile organic compounds (VOC value, 30 minutes at 90° C.) and also the fraction of condensable substances (fog value, 60 minutes at 120° C.), in particular the catalysis-based emissions, the emissions of individual constituent parts of catalyst combinations according to the present invention or of their decomposition or conversion products, was determined in line with the VDA 278 test protocol as of October 2011. The procedure for performing the corresponding thermal desorption with subsequent coupled gas chromatography/mass spectrometry (GC/MS) is described below.

a) Measurement technique: Thermal desorption was performed using a "TDS2" thermal desorber with sample changer from Gerstel of Mülheim combined with an Agilent 7890/5975 GC/MSD system.

b) Measurement conditions for VOC measurements are reported in tables 3 and 4.

TABLE 3

Thermal desorption measurement parameters for VOC analysis run.

| | |
|---|---|
| Thermal desorption | Gerstel TDS2 |
| Desorption temperature | 90° C. |
| Desorption time | 30 min |
| Flow rate | 65 ml/min |
| Transfer line | 280° C. |
| Cryofocusing | KAS 4 |
| Liner | Glass vaporizer tube with silanized glass wool |
| Temperature | −150° C. |

TABLE 4

Gas chromatography/mass spectrometry measurement parameters for VOC analysis run.

| | |
|---|---|
| GC | Capillary GC Agilent 7890 |
| Injector | PTV Split 1:50 |
| Temperature programme | −150° C.; 1 min; ↗10° C./s; 280° C. |
| Column | Agilent 19091B-115, Ultra 2, 50 m * 0.32 mm dF 0.5 μm |
| Flow rate | 1.3 ml/min constant flow |
| Temperature programme | 50° C.; 2 min; ↗3° C./min; 92° C.; ↗5° C./min; 160° C.; ↗10° C./min; 280° C., 20 min |
| Detector | Agilent MSD 5975 |
| Mode | Scan 29-350 amu 2.3 scans/sec |
| Evaluation | Evaluation of total ion current chromatogram via calculation as toluene equivalent | c) Calibration: For calibration, 2 μl of a mixture of toluene and hexadecane in methanol (each at 0.125 mg/ml) were introduced into a cleaned adsorption tube packed with Tenax® TA (mesh 35/60) and measured (desorption 5 min; 280° C.).

d) Tenax TA is a porous polymeric resin based on 2,6-diphenylene oxide and is obtainable, for example, from Scientific Instrument Services, 1027 Old York Rd., Ringoes, N.J. 08551.

e) Sample preparation for VOC measurement: 15 mg of foam in three partial samples were placed in a thermal desorption tube. Care was taken not to compress the foam.

f) Sample preparation for fog measurement: The same foam sample as for the VOC measurement was used. As regards the measuring arrangement, the VOC measurement was always carried out first and then the fog measurement, while an autosampler system was used to ensure a constant separation in each case between the corresponding VOC and fog measurements.

g) The fog measurement conditions are shown in tables 5 and 6.

TABLE 5

Thermal desorption measurement parameters for fog analysis run.

| | |
|---|---|
| Thermal desorption | Gerstel TDS2 |
| Desorption temperature | 120° C. |
| Desorption time | 60 min |
| Flow rate | 65 ml/min |
| Transfer line | 280° C. |
| Cryofocusing | KAS 4 |
| Liner | Glass vaporizer tube with silanized glass wool |
| Temperature | −150° C. |

TABLE 6

Gas chromatography/mass spectrometry measurement parameters for fog analysis run.

| | |
|---|---|
| GC | Capillary GC Agilent 7890 |
| Injector | PTV Split 1:50 |
| Temperature programme | −150° C.; 1 min; ↗10° C./s; 280° C. |
| Column | Agilent 19091B-115, Ultra 2, 50 m * 0.32 mm dF 0.5 μm |
| Flow rate | 1.3 ml/min constant flow |
| Temperature programme | 50° C.; 2 min; ↗25° C./min; 160° C.; ↗10° C./min; 280° C.; 20 min |
| Detector | Agilent MSD 5975 |
| Mode | Scan 29-450 amu 2.3 scans/sec |
| Evaluation | Evaluation of total ion current chromatogram via calculation as hexadecane equivalent | h) Calibration: For calibration, 2 μl of a mixture of toluene and hexadecane in methanol (each at 0.125 mg/ml) were introduced into a cleaned adsorption tube packed with Tenax® TA (mesh 35/60) and measured (desorption 5 min; 280° C.).

Determination of Room Temperature Emission by Test Chamber Test (TC):

The room temperature emission, in particular the catalysis-based emissions, the emissions of individual constituents of catalyst combinations according to the present invention or their decomposition or conversion products, from the foams obtained was determined in accordance with the DIN method DIN EN ISO 16000-9:2008-04. Sampling took place after 24 hours. For this, 2 litres of the test chamber atmosphere were passed at a flow rate of 100 ml/min through an adsorption tube packed with Tenax® TA (mesh35/60). The procedure for performing the thermal desorption with subsequent coupled gas chromatography/mass spectrometry (GC/MS) is described below.

a) Measurement technique: Thermal desorption was performed using a "TDS2" thermal desorber with sample changer from Gerstel of Mülheim combined with an Agilent 7890/5975 GC/MSD system.
b) The measurement conditions are reported in tables 7 and 8.

TABLE 7

Thermal desorption measurement parameters for test chamber measurement.

| | |
|---|---|
| Thermal desorption | Gerstel TDS2 |
| Desorption temperature | 280° C. |
| Desorption time | 5 min |
| Flow rate | 65 ml/min |
| Transfer line | 280° C. |
| Cryofocusing | KAS 4 |
| Liner | Glass vaporizer tube with silanized glass wool |
| Temperature | −150° C. |

TABLE 8

Gas chromatography/mass spectrometry measurement parameters for test chamber measurement.

| | |
|---|---|
| GC | Capillary GC Agilent 7890 |
| Temperature programme | −150° C.; 1 min; ↗10° C./s; 280° C. |
| Column | Agilent 19091B-115, Ultra 2, 50 m * 0.32 mm dF 0.5 µm |
| Flow rate | 1.3 ml/min constant flow |
| Temperature programme | 50° C.; 2 min; ↗3° C./min; 92° C.; ↗5° C./min; 160° C.; ↗10° C./min; 280° C., 20 min |
| Detector | Agilent MSD 5975 |
| Evaluation | Evaluation of total ion current chromatogram via calculation as toluene equivalent | c) For calibration, 2 µl of a mixture of toluene and hexadecane in methanol (each at 0.125 mg/ml) were introduced into a cleaned adsorption tube packed with Tenax® TA (mesh 35/60) and measured (desorption 5 min; 280° C.).

Flexible Foam Foaming Examples

Example 2: Production of Flexible Polyurethane Slabstock Foams

The nitrogenous compounds of the present invention were performance tested by using the foam formulation reported in table 9.

TABLE 9

Formulation 2 for flexible slabstock foam applications.

| Formulation 2 | Parts by mass (pphp) |
|---|---|
| Polyol 1[1] | 100 parts |
| Water | 3.00 parts |
| Tin catalyst[2] | 0.20 parts |
| Amine | 0.20 parts |
| TEGOSTAB® BF 2370[3] | 0.80 parts |
| Desmodur® T 80[4] | 38.1 parts |

[1]Polyol 1: Glycerol-based polyether polyol with an OH number of 48 mgKOH/g.
[2]KOSMOS® 29, obtainable from Evonik Industries: Tin(II) salt of 2-ethylhexanoic acid.
[3]Polyether-modified polysiloxane.
[4]T 80 tolylene diisocyanate (80% 2,4-isomer, 20% 2,6-isomer) from Bayer, 3 mPa · s, 48% NCO, functionality 2.

The foaming was carried out with 500 g of polyol; the other constituents of the formulation were arithmetically converted correspondingly. In this arithmetic conversion, 1.00 part of a component meant 1.00 g of a substance per 100 g of polyol, for example.

The foams were produced by hand mixing. The formulations reported in table 9 were used with various nitrogenous catalysts (amines). This was done by weighing polyol, conventional or inventive nitrogenous catalyst (amine), tin catalyst, water and foam stabilizer into a beaker and mixing at 1000 rpm for 60 seconds. After admixture of the isocyanate (TDI), the reaction mixture was stirred at 2500 rpm for 7 s and immediately transferred into a paper-lined box (27 cm×27 cm in base area and 27 cm in height). The following characteristic parameters were determined to evaluate the catalytic properties: cream time, full-rise time, full-rise height, strength of blow-off and settling of foam at the end of the rise period.

Defined shapes were cut out of the resulting slabstock foams for later analysis. The following physical properties were determined on the test specimens: foam density (FD), porosity (=air permeability) and compression load deflection CLD (40%).

The results from evaluating the catalytic properties of the inventive nitrogenous compounds of formulae (III), (IV), (V) and (VI) and also the physical properties of the resulting flexible slabstock foams are collated in table 10. The following were used as comparative catalysts to represent the prior art: triethylenediamine, 33 wt % solution in dipropylene glycol (TEGOAMIN® 33, available from Evonik Industries), N,N-dimethylethanolamine (TEGOAMIN® DMEA, available from Evonik Industries), 1,1'-{[3-(dimethylamino)propyl]imino}bis-2-propanol (TEGOAMIN® ZE 1, available from Evonik Industries), bis(2-dimethylaminoethyl ether), 70 wt % solution in dipropylene glycol (TEGOAMIN® BDE, available from Evonik Industries) and N,N,N'-trimethyl-N'-(2-hydroxyethyl)bis(2-aminoethyl) ether (Jeffcat® ZF-10, available from Huntsman). 0.20 pphp (=parts by weight per 100 parts by weight of polyol) of amine was used in each case.

TABLE 10

Results of foaming tests for formulation 2 (table 9).

| Amine | Full-rise time [s] | Settling [cm] | Height [cm] | Foam density [kg/m³] | Porosity [mm][1] | CLD 40% [kPa] |
|---|---|---|---|---|---|---|
| TEGOAMIN® 33 | 118 | 0.1 | 28.8 | 31.7 | 22 | 4.3 |
| TEGOAMIN® ZE 1 | 142 | 0.2 | 28.3 | 31.9 | 24 | 4.1 |

TABLE 10-continued

Results of foaming tests for formulation 2 (table 9).

| Amine | Full-rise time [s] | Settling [cm] | Height [cm] | Foam density [kg/m$^3$] | Porosity [mm][1] | CLD 40% [kPa] |
|---|---|---|---|---|---|---|
| TEGOAMIN® DMEA | 135 | 0.2 | 28.2 | 31.0 | 14 | 3.7 |
| TEGOAMIN® BDE | 91 | 0.7 | 28.2 | 30.8 | 12 | 3.4 |
| Jeffcat® ZF-10 | 110 | 0.5 | 28.7 | 30.7 | 11 | 3.6 |
| FORMULA (III) | 139 | 0.2 | 28.1 | 31.9 | 16 | 4.0 |
| FORMULA (IV) | 115 | 0.4 | 29.7 | 30.6 | 16 | 3.4 |
| FORMULA (V) | 111 | 0.5 | 29.8 | 30.3 | 17 | 3.5 |
| FORMULA (VI) | 108 | 0.5 | 28.5 | 31.0 | 14 | 3.6 |

[1] = (dynamic pressure in mm of water column).

As is discernible from table 10, the nitrogenous compounds according to formulae (III), (IV), (V) and (VI) according to the present invention exhibit good to very good catalytic activity in flexible foam. The selectivity and activity of the compound according to formula (III) in flexible foam is approximately equal to that of TEGOAMIN® DMEA, but specific modification makes it possible, as previously observed in the rigid foam experiments, to amplify the selectivity and activity in the direction of blow or gel catalysis. To with the compounds of formulae (IV) and (V) are capable of yielding better results than TEGOAMIN® ZE 1, so these catalysts must be classed selectivitywise as balanced catalysts in the range between TEGOAMIN® ZE 1 and TEGOAMIN® 33. However, activity at a usage level of 0.25 pphp is already so high that the catalyst quantity would have to be reduced to obtain a similar catalytic profile as with TEGOAMIN® 33. The compound of formula (VI), by contrast, must in turn be classed as a more blow-selective catalyst which in terms of activity is distinctly stronger than TEGOAMIN® DMEA and can be classified between Jeffcat® ZF-10 and TEGOAMIN® BDE, although compound (III) is more balanced in its catalytic performance, making it possible in flexible foam use to reduce the usage level of tin catalysts compared with analogous systems and formulations with Jeffcat® ZF-10 and TEGOAMIN® BDE as amine catalysts used.

Example 3: Emissions of Flexible Polyurethane Slabstock Foams

The influence of the nitrogenous compounds of the present invention on foam emissions was investigated by using the foam formulation reported in table 11, which contains a low-emission polyol and a low-emission tin catalyst, for the performance testing of flexible slabstock foams.

TABLE 11

Formulation 3, foam emissions in flexible slabstock foam applications.

| Formulation 3 | Parts by mass (pphp) |
|---|---|
| Polyol 1[1] | 100 parts |
| Water | 3.00 parts |
| Tin catalyst[2] | 0.60 parts |
| Amine | 0.15 parts |
| TEGOSTAB® BF 2370[3] | 0.80 parts |
| Desmodur® T 80[4] | 41.6 parts |

[1] Polyol 1: Low-emission glycerol-based polyether polyol with an OH number of 56 mgKOH/g.
[2] KOSMOS® EF, obtainable from Evonik Industries: Tin(II) salt of ricinoleic acid.
[3] Polyether-modified polysiloxane.
[4] T 80 tolylene diisocyanate (80% 2,4-isomer, 20% 2,6-isomer) from Bayer, 3 mPa·s, 48% NCO, functionality 2.

The foaming was carried out with 500 g of polyol; the other constituents of the formulation were arithmetically converted correspondingly. In this arithmetic conversion, 1.00 part of a component meant 1.00 g of a substance per 100 g of polyol, for example.

The foams were produced by hand mixing. The formulations reported in table 11 were used with various nitrogenous catalysts (amines). This was done by weighing low-emission polyol, conventional or inventive nitrogenous catalyst (amine), low-emission tin catalyst, water and foam stabilizer into a beaker and mixing at 1000 rpm for 60 seconds. After admixture of the isocyanate (TDI), the reaction mixture was stirred at 2500 rpm for 7 s and immediately transferred into a paper-lined box (27 cm×27 cm in base area and 27 cm in height) and the resultant foam was sealed airtight with polyethylene film after blow-off. Following a curing phase of 24 hours, a defined cube (7 cm×7 cm×7 cm) was cut out of the resultant slabstock foam and completely enclosed in aluminium foil and further sealed with polyethylene film.

The emission characteristics of the foams described above were subsequently investigated at room temperature by the test chamber test in line with the DIN method DIN EN ISO 16000-9:2008-04, as described above. The results are given in table 12.

TABLE 12

Emissions of flexible slabstock foams from formulation 3 (table 11).

| | VOC content by test chamber (TC) test | |
|---|---|---|
| Amine | $TC_{tot}$[1] [µg/m$^3$] | $TC_{amine}$[1] [µg/m$^3$] |
| TEGOAMIN® 33 | 90 | 61 |
| TEGOAMIN® ZE 1 | <20 | <10 |
| TEGOAMIN® DMEA | 30 | <10 |
| TEGOAMIN® BDE | 310 | 280 |
| Jeffcat® ZF-10 | <20 | <10 |
| FORMULA (III) | <20 | <10 |
| FORMULA (IV) | <20 | <10 |
| FORMULA (V) | <20 | <10 |
| FORMULA (VI) | 30 | <10 |

[1] $TC_{tot}$ = total emission; $TC_{amine}$ = amine emissions of all volatile organic compounds in test chamber test.

Table 12 shows that amine emissions on using the nitrogenous compounds of formulae (III), (IV), (V) and (VI) according to the invention can be reduced not just in comparison with unreactive amines such as TEGOAMIN® BDE or TEGOAMIN® 33 and similar values are obtained as with incorporable VOC-optimized amines such as TEGOAMIN® DMEA, TEGOAMIN® ZE 1 and Jeffcat® ZF-10. Particularly compared with the use of TEGOAMIN® BDE and TEGOAMIN® 33, therefore, alternative use of the catalysts according to formula (III), (IV), (V) or (VI) makes it possible to obtain flexible polyurethane slabstock foams having distinctly reduced amine emissions, in this case even foamed materials that are virtually free of amine emissions. Similarly, as regards the amine emissions corresponding to VDA 278, as described above, a partial reduction in amine emissions was observed on using a corresponding catalyst replacement, in particular on using compounds according to formula (III), (IV) or (V). In addition, as is evident from table 10 (Example 2), using the compound of formula (III) makes it possible to shorten the full-rise time versus reactive amines such as Jeffcat® ZF-10 and TEGOAMIN® DMEA, which favour the blowing reaction, which combined with the emission values obtained on use for production of flexible slabstock foams represents an appreciable advantage for example.

Example 4: Production of HR Foams (Slabstock/Molded)

The inventive nitrogenous compounds were performance tested in the foam formulation reported in table 13.

TABLE 13

Formulation 4 for cold-cure flexible foam applications (HR - slabstock/molded).

| Formulation 4 | Parts by mass (pphp) |
|---|---|
| Polyol 1[1] | 70.0 parts |
| Polyol 2[2] | 30.0 parts |
| Water | 3.70 parts |
| Glycerol | 0.50 parts |
| Diethanolamine (DEOA) | 1.00 parts |
| Amine | 0.25 parts |
| TEGOSTAB ® B 8716 LF2[3] | 1.00 parts |
| Desmodur ® T 80[4] | 44.0 parts |

[1]Polyol 1: Sorbitol/glycerol-based polyether polyol with an OH number of 32 mgKOH/g.
[2]Polyol 2: Glycerol-based polyether polyol containing 43% of solids (SAN), with an OH number of 20 mgKOH/g.
[3]Preparation of organomodified polysiloxanes.
[4]T 80 tolylene diisocyanate (80% 2,4-isomer, 20% 2,6-isomer) from Bayer, 3 mPa · s, 48% NCO, functionality 2.

The same foaming methods were employed here as with the conventional flexible polyurethane foam in Examples 2 and 3.

The foaming was carried out with 500 g of polyol; the other constituents of the formulation were arithmetically converted correspondingly. In this arithmetic conversion, 1.00 part of a component meant 1.00 g of a substance per 100 g of polyol, for example.

To effect foaming, the polyol, water, amine and the silicone stabilizer were thoroughly mixed under agitation. After admixture of the isocyanate, the mixture was stirred with a stirrer at 3000 rpm for 4 s and poured into a paper-lined box (27 cm×27 cm in base area and 27 cm in height). The result was a foamed material which was subjected to the performance tests described hereinbelow.

The results from evaluating the catalytic properties of the inventive nitrogenous compounds of formulae (III), (IV) and (V) and also the physical properties of the resulting foams are collated in table 14. The following were used as comparative catalysts to represent the prior art: triethylenediamine, 33 wt % solution in dipropylene glycol (TEGOAMIN® 33, available from Evonik Industries), 1,1'-{[3-(dimethylamino)propyl]imino}bis-2-propanol (TEGOAMIN® ZE 1, available from Evonik Industries), 1-[bis[3-(dimethylamino)propyl]amino]-2-propanol (Jeffcat® ZR-50, available from Huntsman). 0.25 pphp (=parts by weight per 100 parts by weight of polyol) of amine was used in each case.

TABLE 14

Results of foaming tests for formulation 4 (table 13).

| Amine | Gelling time [s] | Full-rise time [s] | Height [cm] | Settling [cm] | Cell count[1] [cm$^{-1}$] |
|---|---|---|---|---|---|
| TEGOAMIN ® 33 | 85 | 151 | 31.2 | 0.4 | 10.5 |
| TEGOAMIN ® ZE 1 | 131 | 215 | 30.4 | −0.1 | 9.0 |
| Jeffcat ® ZR-50 | 86 | 153 | 32.0 | 0.7 | 10.5 |
| FORMULA (III) | 159 | 247 | 27.0 | −0.2 | 9.0 |
| FORMULA (IV) | 76 | 141 | 32.3 | 0.4 | 11.0-11.5 |
| FORMULA (V) | 71 | 128 | 32.6 | 0.6 | 11.0-11.5 |

[1]Cell count = number of cells per cm [cm$^{-1}$].

As is apparent from table 14, the nitrogenous compounds of formulae (III), (VI) and (V) according to the present invention display good to very good catalytic activity in cold-cure flexible foam. As regards their catalytic profile, catalysts (III), (IV) and (V) can be classed as balanced catalysts in that they catalyse both the gelling and the blowing reaction, while particularly the compounds of formulae (IV) and (V) exhibit enhanced activity and additionally a distinct amplification of gel selectivity versus compound (III). The compounds of formulae (IV) and (V) are more active and more selective than TEGOAMIN® ZE 1 and in this regard, considered on an equal part by weight basis, are similar to Jeffcat® ZR-50 which, besides TEGOAMIN® 33, is one of the most active prior art amines for such applications to preferentially catalyse the gelling reaction, but in contradistinction to TEGOAMIN® 33 is also low-emission.

The emission behaviour of the above-described foams was subsequently investigated in line with the VDA 278 test method as of October 2011, as described above. The results are shown in table 15.

TABLE 15

VDA 278 emissions of cold-cure flexible foams

| | Content of volatile organic compounds (VOC) | | | |
|---|---|---|---|---|
| Amine | VOC$_{tot}$[1] [µg/g] | VOC$_{amine}$[1] [µg/g] | Fog$_{tot}$[2] [µg/g] | Fog$_{amine}$[2] [µg/g] |
| TEGOAMIN ® 33 | 508 | 186 | 270 | <10 |
| TEGOAMIN ® ZE 1 | 321 | <10 | 334 | <10 |
| Jeffcat ® ZR-50 | 330 | <10 | 370 | 98 |
| FORMULA (III) | 376 | <10 | 250 | <10 |
| FORMULA (IV) | 310 | <10 | 305 | <10 |
| FORMULA (V) | 330 | <10 | 289 | <10 |

[1]VOC$_{tot}$ = total emission; VOC$_{amine}$ = amine emissions of all volatile organic compounds at 90° C. (30 minutes).
[2]Fog$_{tot}$ = total emission; Fog$_{amine}$ = amine emissions of all volatile organic compounds at 120° C. (60 minutes).
[3]n.d. = not detectable.

As can be seen in table 15, the nitrogenous compounds of formulae (III), (IV) and (V) according to the present invention do not give rise to any emissions under VDA 278. Particularly with regard to the use of such amines as catalysts for producing PU systems for application in automotive interiors, as described above, this is an advantage over other amines according to the prior art, for example TEGOAMIN® 33. With regard to VOC emissions, reactive prior art types, for example Jeffcat® ZR-50 and TEGOAMIN® ZE 1, also meet these requirements. TEGOAMIN® ZE 1 also passes the fog test, but in terms of its catalytic activity is distinctly weaker than Jeffcat® ZR-50 and than the compound of formulae (IV) and (V). Jeffcat® ZR-50, in addition to the good VOC emission values mentioned, has similar catalytic activity to the compounds of formulae (IV) and (V) (cf. table 14), in fact even slightly better than the compound of formula (III), but all the compounds according to formulae (III), (IV) and (V) have improved fog emission values over Jeffcat® ZR-50. For automotive applications, this means a reduction in potential deposits of readily condensable substances in the automotive interior, for example on the windshield to produce what is known as windshield fogging. In summary, particularly the compounds of formulae (IV) and (V) possess an outstanding catalysis and emission profile for manufacture of cold-cure flexible foams.

The invention claimed is:

1. A polyurethane composition comprising a reaction product of a polyisocyanate, a polyol, and a nitrogenous compound,
wherein the nitrogenous compound is formula (I)

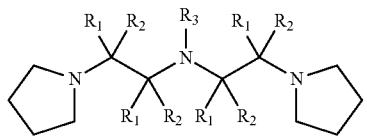
(I)

with
$R_1$ and $R_2$ being the same or different and each independently being hydrogen or an organic moiety of 1 to 30 carbon atoms,
with $R_3$ being H or an organic moiety of 1 to 20 carbon atoms, which may be interrupted by one or more heteroatoms, wherein an amount of the nitrogenous compounds of formulae (I), is a mass fraction of 0.01 to 20.0 parts (pphp) based on 100 parts (pphp) of the polyol.

2. The polyurethane composition according to claim 1, wherein $R_1$ and $R_2$ are hydrogen,
wherein the nitrogenous compound of formula (I) comprises a compound conforming to formula (II)

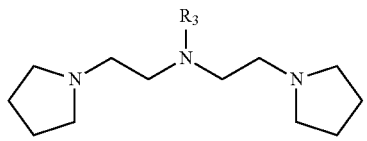
(II)

3. The polyurethane composition according to claim 1, wherein formula (I) is selected from the group consisting of formula (III), (IV), (V), (VI) or (VII)

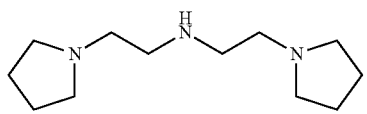
(III)

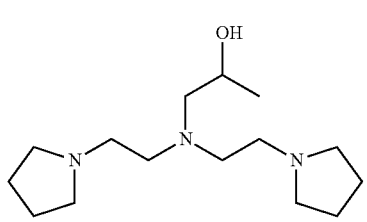
(IV)

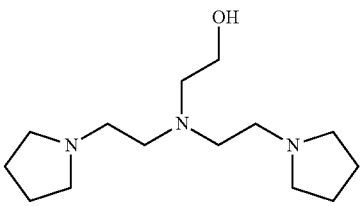
(V)

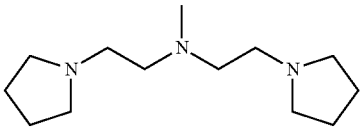
(VI)

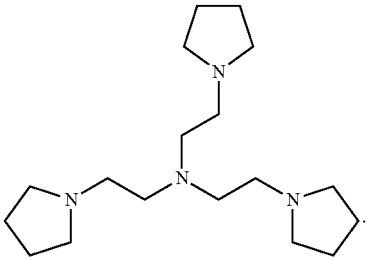
(VII)

4. The polyurethane composition according to claim 3, wherein production of a polyurethane comprises preparing a polyurethane composition including at least one nitrogenous compound of formulae (III), (IV), (V), (VI) or (VII), blowing agent, and reacting this composition.

5. The polyurethane composition according to claim 3, wherein the at least one nitrogenous compound of formulae (III), (IV), (V), (VI) or (VII), in combination with at least one solvent, wherein the mass ratio of total catalyst used to solvent is in the range from 100:1 to 1:4.

6. The polyurethane composition comprising at least one nitrogenous compound of formulae (III), (IV), (V), (VI) or (VII) of claim 3, wherein the composition comprises at least one isocyanate component, and wherein the composition comprises additional amine catalysts not conforming to formulae (I), (III), (IV), (V), (VI) or (VII).

7. The polyurethane composition according to claim 1, wherein polyurethane composition is a rigid polyurethane foam, a flexible polyurethane foam, a viscoelastic foam, a cold-cure foam (also called high-resilience (HR) foam), a semi-rigid polyurethane foam, a thermoformable polyurethane foam or an integral foam.

8. A product comprising the polyurethane composition according to claim 7 wherein the product is selected from the group consisting of refrigerator insulation, insulation panel, sandwich element, pipe insulation, spray foam, 1- and 1.5-component can foam, wood imitation, modelling foam, floral foam, packaging foam, mattress, furniture cushioning, furniture molding foam, pillows, rebonded foam, sponge foam, automotive seat cushioning, headrest, dashboard, automotive interior, automotive roof liner, sound absorption material, steering wheel, shoe sole, carpet backing foam, filter foam, sealant, sealant foam and adhesive.

9. The polyurethane composition according to claim 2, wherein polyurethane composition is a rigid polyurethane foam, a flexible polyurethane foam, a viscoelastic foam, a cold-cure foam (also called high-resilience (HR) foam), a semi-rigid polyurethane foam, a thermoformable polyurethane foam or an integral foam.

10. The polyurethane composition according to claim 3, wherein polyurethane composition is a rigid polyurethane foam, a flexible polyurethane foam, a viscoelastic foam, a cold-cure foam (also called high-resilience (HR) foam), a semi-rigid polyurethane foam, a thermoformable polyurethane foam or an integral foam.

11. The polyurethane composition according to claim 4, wherein polyurethane composition is a rigid polyurethane foam, a flexible polyurethane foam, a viscoelastic foam, a cold-cure foam (also called high-resilience (HR) foam), a semi-rigid polyurethane foam, a thermoformable polyurethane foam or an integral foam.

12. The polyurethane composition according to claim 5, wherein polyurethane composition is a rigid polyurethane foam, a flexible polyurethane foam, a viscoelastic foam, a cold-cure foam (also called high-resilience (HR) foam), a semi-rigid polyurethane foam, a thermoformable polyurethane foam or an integral foam.

13. The polyurethane composition according to claim 6, wherein polyurethane composition is a rigid polyurethane foam, a flexible polyurethane foam, a viscoelastic foam, a cold-cure foam (also called high-resilience (HR) foam), a semi-rigid polyurethane foam, a thermoformable polyurethane foam or an integral foam.

14. The product according to claim 8 wherein the product is packaging foam.

15. The product according to claim 8 wherein the product is selected from the group consisting of refrigerator insulation and pipe insulation.

16. The product according to claim 8 wherein the product is a foam selected from the group consisting of rigid polyurethane foam, a flexible polyurethane foam, a viscoelastic foam, a semi-rigid polyurethane foam, and a thermoformable polyurethane foam.

17. The product according to claim 8 wherein the product is a mattress.

18. The product according to claim 8 wherein the product is furniture cushioning.

19. The product according to claim 8 wherein the product is automotive seat cushioning.

* * * * *